(12) United States Patent
Steiner et al.

(10) Patent No.: US 11,937,555 B2
(45) Date of Patent: Mar. 26, 2024

(54) STUMP GRINDER

(71) Applicant: Venture Products, Inc., Orrville, OH (US)

(72) Inventors: Roy I. Steiner, Dalton, OH (US); Josiah Daniel Ramseyer, Orrville, OH (US)

(73) Assignee: VENTURE PRODUCTS, INC., Orrville, OH (US)

( * ) Notice: Subject to any disclaimer, the term of this patent is extended or adjusted under 35 U.S.C. 154(b) by 0 days.

(21) Appl. No.: 17/822,838

(22) Filed: Aug. 29, 2022

(65) Prior Publication Data

US 2024/0065185 A1 Feb. 29, 2024

(51) Int. Cl.
*A01G 23/06* (2006.01)
*B02C 18/24* (2006.01)
*B02C 21/02* (2006.01)

(52) U.S. Cl.
CPC ............ *A01G 23/067* (2013.01); *B02C 18/24* (2013.01); *B02C 21/026* (2013.01); *B02C 2021/023* (2013.01)

(58) Field of Classification Search
CPC .... A01G 23/067; B02C 18/24; B02C 21/026; B02C 2021/023
See application file for complete search history.

(56) References Cited

U.S. PATENT DOCUMENTS

| | | | | |
|---|---|---|---|---|
| 3,217,765 | A * | 11/1965 | Anderson | A23N 15/10 241/73 |
| 4,619,412 | A * | 10/1986 | Willingham | A01K 31/04 404/91 |
| 5,655,581 | A | 8/1997 | Craft | |
| 5,887,634 | A * | 3/1999 | Theisen | A01G 23/067 144/241 |
| 7,150,300 | B1 * | 12/2006 | Peterson | A01G 23/067 144/4.1 |

OTHER PUBLICATIONS

Grind Any Stump Anywhere—Ventrac KC180 Stump Grinder, retrieved date Jul. 10, 2023. https://www.youtube.com/watch?v=qPoxq7QkARU&t=1s.*

(Continued)

*Primary Examiner* — Matthew Katcoff
*Assistant Examiner* — Mohammed S. Alawadi
(74) *Attorney, Agent, or Firm* — Sand, Sebolt & Wernow Co., LPA

(57) ABSTRACT

A stump grinding system that includes a vehicle and a stump grinder adapted to engage with the vehicle. The vehicle has a first end, a second end opposite to the first end, and a longitudinal axis defined therebetween. The stump grinder includes a chassis operably engaged with the vehicle at one of the first end and the second end. The stump grinder also includes a body operably engaged with the chassis and a grinder wheel operably engaged with the body and partially disposed outside of the body from the vehicle. The stump grinder also includes a drive assembly operably engaged with the grinder wheel and the body. The grinder wheel of the stump grinder is configured to rotate in a plane that is orthogonal to the longitudinal axis of the vehicle.

19 Claims, 18 Drawing Sheets

(56) References Cited

OTHER PUBLICATIONS

Ventrac LC150 Stump Grinder, https://www.youtube.com/watch?v=rykP0JoDMZw&t=20s; Viewed Apr. 6, 2022; Orrville, Ohio, USA.
Ventrac KC180 Stump Grinder Operator's Manual; Revised Jan. 9, 2020; Orrville, Ohio, USA.
Eterra Vortex Stump Grinder Specification Sheet; https://www.eterra-usa.com/vortex-skid-steer-stump-grinder-attachment/; 2022 by Eterra Attachments, LLC; USA.
Ventrac LC150 Stump Grinder Specification Sheet; Created on Jun. 5, 2015; Orrville, Ohio, USA.
Ventrac LC150 Stump Grinder Operator's Manual; Created on Dec. 18, 2018; Orrville, Ohio, USA.
Ventrac KC180 Stump Grinder Specification Sheet; Created on Feb. 24, 2020; Orrville, Ohio, USA.

\* cited by examiner

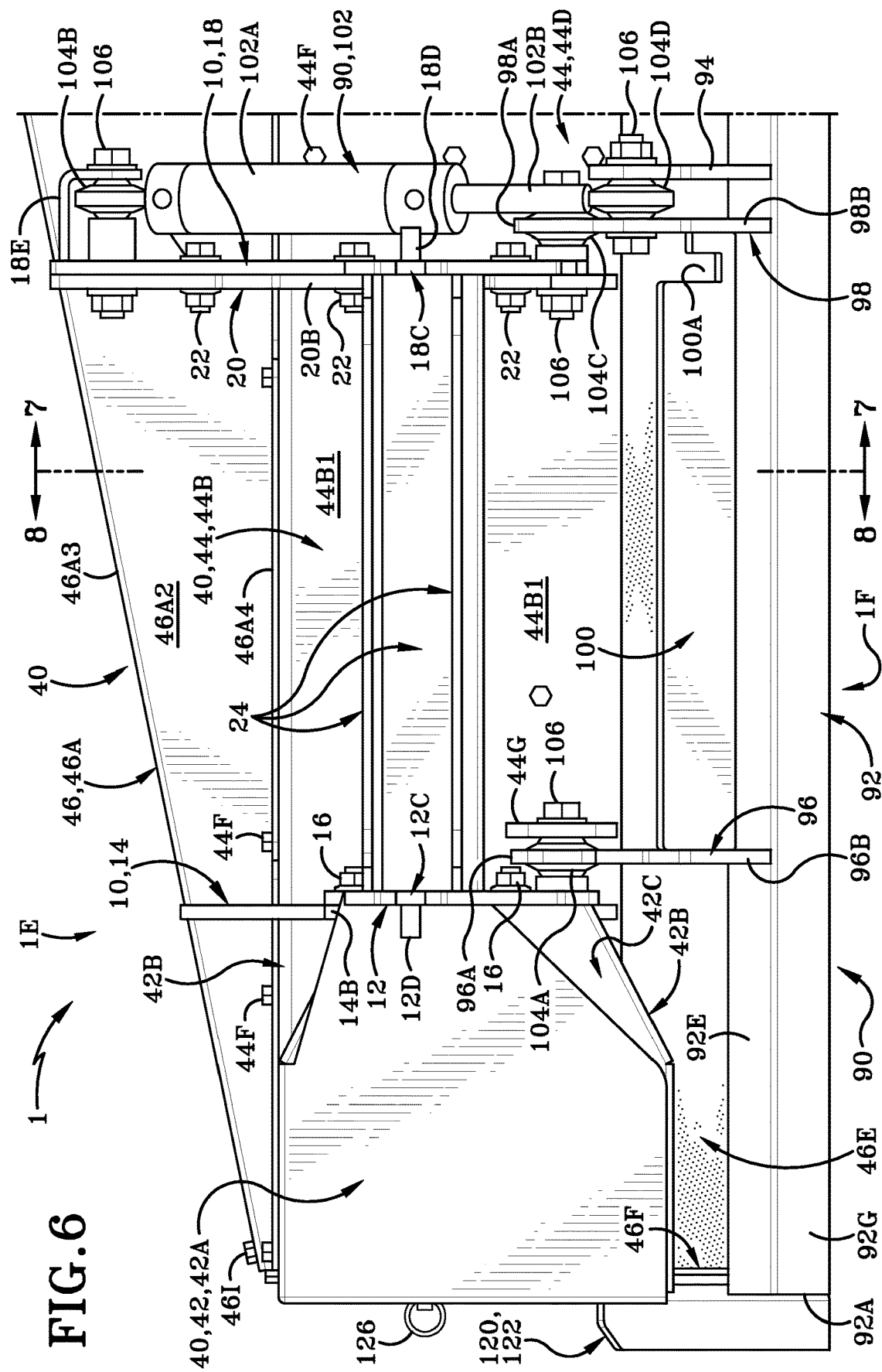

STUMP GRINDER

TECHNICAL FIELD

The present disclosure relates generally to an implement. More particularly, the present disclosure relates to a stump grinder operably engaged with a vehicle for cutting and grinding a stump. Specifically, the present disclosure relates to a stump grinder operably engaged with a vehicle for cutting and grinding a stump via a grinder wheel disposed orthogonal to a longitudinal direction of the vehicle.

BACKGROUND

Stump grinders are versatile tools for cutting and grinding various types of stumps from a ground surface. Typically, a stump grinder may be operably engaged with a vehicle (e.g., a tractor or similar vehicle of the like) or operated independently. Generally, a stump grinder is used in a variety of landscaping operations for grinding a stump to a certain depth into a ground surface including eliminating hazards and safety risks with an exposed stump, eliminating ready habits for specific types of insects and animals, and reducing impacts to the overall health of a person's landscaping. However, common stump grinders may be difficult to operate when cutting and grinding a stump due to the size of the stump, the accuracy of aligning a grinder wheel directly over and on the stump, and other various difficulties of the like when operating a stump grinder.

To combat these difficulties, an operator of the stump grinder may use specific methods of operating the stump grinder and/or components operably engaged with the stump grinder to accurately align a grinder wheel of the stump grinder with a stump. In one instance, an operator may simply visually align the grinder wheel with the stump prior to operating and powering on the stump grinder. In this instance, however, the operator must periodically step away from operating the stump grinder to determine if the grinder wheel is still cutting and grinding the stump. Such periodic and/or continuous inspection of the grinder wheel may cause long project times and labor when grinding down a stump and/or a plurality of stumps given the task. Such periodic and/or continuous inspection of the grinder wheel may also lead to hazardous or safety risks since the operator may being viewing the grinder wheel when the stump grinder is provided in an operating mode resulting in the grinder wheel moving and potentially throwing debris and cut wood material. In another instance, an operator may be able to align a grinder wheel of a stump grinder at a fast pace due to vast experience and knowledge of using a specific stump grinder for perform stump grinding operation. However, such vast experience and knowledge must be accomplished with extensive time and labor.

SUMMARY

The presently disclosed stump grinder includes a structural configuration that enables an operator to view a portion of a grinder wheel without moving from an operator seat of a vehicle operably engaged with the stump grinder. Such visualization of the grinder wheel from the operator seat is enabled due the grinder wheel being disposed orthogonal to a longitudinal travel direction of the vehicle. The disclosed stump grinder reduces overall grinding time and labor due to the operator being able to view the grinder wheel relative to a stump by remaining on the vehicle during the grinding operations. The disclosed stump grinder reduces hazardous and safety risk to the operator since the operator remains on the vehicle when viewing and inspecting the grinder wheel relative to a stump. As such, the stump grinder disclosed herein addresses some of the inadequacies of previously known stump grinders.

In one aspect, an exemplary embodiment of the present disclosure may provide a stump grinding system. The stump grinding system includes a vehicle having a first end, a second end opposite to the first end, and a longitudinal axis defined therebetween. The stump grinding system also includes a stump grinder adapted to engage with the vehicle. The stump grinder includes a chassis operably engaged with the vehicle at one of the first end and the second end; a body operably engaged with the chassis; a grinder wheel operably engaged with the body and partially disposed outside of the body from the vehicle; and a drive assembly operably engaged with the grinder wheel and the body. The grinder wheel is configured to rotate in a plane that is orthogonal to the longitudinal axis of the vehicle.

This exemplary embodiment or another exemplary embodiment may further include that wherein a portion of the grinder wheel of the stump grinder is visible from an operator seat of the vehicle. This exemplary embodiment or another exemplary embodiment may further include that wherein the body of the stump grinder further comprises: a first end; a second end opposite to the first end and defining an opening thereof; and a chamber defined between the first end and the second end; wherein a first portion of the grinder wheel is disposed inside of the chamber and a second portion of the grinder wheel passes through the opening outside of the chamber. This exemplary embodiment or another exemplary embodiment may further include that wherein the drive assembly of the stump grinder further comprises: a power takeoff (PTO) assembly operably engaged with a PTO of the vehicle; a belt drive assembly operably engaged with the PTO assembly; and a grinder drive shaft operably engaged with the belt drive assembly and the grinder wheel, the grinder drive shaft having a first end, a second end opposite to the first end, and a longitudinal axis defined therebetween that is parallel with the longitudinal axis of the vehicle. This exemplary embodiment or another exemplary embodiment may further include that wherein the PTO assembly comprises: a PTO pulley; a PTO drive shaft operably engaged with the PTO pulley and the belt drive assembly; and a PTO belt operably engaged with the PTO pulley and the PTO of the vehicle. This exemplary embodiment or another exemplary embodiment may further include that wherein the belt drive assembly comprises: a first belt drive pulley operably engaged with the PTO drive shaft; a second belt drive pulley operably engaged with the grinder drive shaft and opposite to the first belt drive pulley; at least one belt operably engaged with the first belt drive pulley and the second drive pulley; and a belt tensioner operably engaged with the at least one belt to maintain the at least one belt with the first belt drive pulley and the second belt drive pulley at a predetermined tension. This exemplary embodiment or another exemplary embodiment may further include that wherein the belt drive assembly comprises: a first belt drive pulley operably engaged with the PTO drive shaft; a second belt drive pulley operably engaged with the grinder drive shaft and opposite to the first belt drive pulley; a plurality of belts operably engaged with the first belt drive pulley and the second drive pulley; and a belt tensioner operably engaged with the plurality of belts to maintain the plurality of belts with the first belt drive pulley and the second belt drive pulley at predetermined tensions. This exemplary embodiment or another exemplary embodiment may further include that wherein the stump grinder further comprises: a first driving axis defined by a PTO drive shaft of the PTO assembly that is parallel with the longitudinal axis of the vehicle; and a second driving axis defined by the grinder drive shaft this is parallel with the first driving axis and the longitudinal axis of the vehicle. This exemplary embodiment or another exemplary embodiment may further include that wherein the stump grinder further comprises: at least one kickstand assembly rotatably engaged with the body; wherein the at least one kickstand assembly is selectively moveable between a stored position and an operating position for supporting the stump grinder. This exemplary embodiment or another exemplary embodiment may further include that wherein the at least one kickstand assembly further comprises: a kickstand; a pivot mechanism rotatably engaging the kickstand to the body to enable the kickstand to be selectively moveable between a supported position and an unsupported position; and a pin selectively engaging the kickstand between the supported position and the unsupported position. This exemplary embodiment or another exemplary embodiment may further include that wherein the stump grinder further comprises: a front end positioned proximate to the body; a rear end positioned proximate to the chassis and opposite to the front end; and a push blade assembly operatively engaged with the body; wherein the push blade assembly is independently rotatable on one or both of the chassis and the body along a longitudinal axis of the stump grinder between the front end of the stump grinder and the rear end of the stump grinder. This exemplary embodiment or another exemplary embodiment may further include that wherein the push blade assembly comprises: a push blade operably engaged with one or both of the chassis and the body, the push blade having a first end, a second end opposite to the first end, and a longitudinal axis defined therebetween; at least one attachment mechanism operably engaging the push blade with the body; and at least one actuator operably engaged with the chassis and the push blade for rotating the push blade along the longitudinal axis of the stump grinder between the stump grinder of the body and the rear end of the stump grinder. This exemplary embodiment or another exemplary embodiment may further include that wherein the longitudinal axis of the push blade is orthogonal to the plane of rotation of the grinder wheel.

In another aspect, an exemplary embodiment of the present disclosure may provide a method of cutting a stump from a ground surface. The method comprises steps of engaging a stump grinder with a vehicle; introducing a grinder wheel of the stump grinder to the stump; initiating rotation of the grinder wheel via a drive assembly of the stump grinder, wherein the grinder wheel rotates in a plane that is orthogonal to a longitudinal axis defined by the vehicle; and cutting the stump from the ground surface.

This exemplary embodiment or another exemplary embodiment may further include a step of aligning a portion of the grinder wheel that protrudes outside of a body of the stump grinder with the stump. This exemplary embodiment or another exemplary embodiment may further include steps of generating a first driving axis, via a power takeoff (PTO) of the vehicle, on a PTO drive shaft of a PTO assembly of the drive assembly; and generating a second driving axis, via a belt drive assembly of the drive assembly, on a grinder drive shaft operably engaged with the grinder wheel. This exemplary embodiment or another exemplary embodiment may further include that wherein the step of generating the first driving axis further includes that the first driving axis is parallel with the longitudinal axis of the vehicle; and wherein the step of generating the second driving axis further includes that the second driving axis is parallel with the longitudinal axis of the vehicle and the first driving axis. This exemplary embodiment or another exemplary embodiment may further include a step of rotating a push blade of a push blade assembly, via an actuator of the push blade assembly, between a front end of the stump grinder and a rear end of the stump grinder. This exemplary embodiment or another exemplary embodiment may further include a step of determining a height of the stump relative to the ground surface, via the push blade, subsequent to the step of cutting the stump from the ground surface. This exemplary embodiment or another exemplary embodiment may further include a step of removing cut stump material, via a push blade assembly, from the ground surface.

In yet another aspect, an exemplary embodiment of the present disclosure may provide a stump grinder for attachment with a vehicle. The stump grinder comprises a chassis operably engaged with the vehicle at one of a first end and a second end of the vehicle. The stump grinder comprises a body operably engaged with the chassis. The stump grinder comprises a grinder wheel operably engaged with the body and partially disposed outside of the body. The stump grinder comprises a drive assembly operably engaged with the grinder wheel and the body, wherein the drive assembly includes a belt drive assembly adapted to rotate the grinder wheel during stump removal operations.

This exemplary embodiment or another exemplary embodiment may further include that wherein the drive assembly of the stump grinder comprises: a power takeoff (PTO) assembly operably engaged with a power takeoff of the vehicle and the belt drive assembly; and a grinder drive shaft operably engaged with the belt drive assembly and the grinder wheel. This exemplary embodiment or another exemplary embodiment may further include that wherein the drive assembly of the stump grinder further comprises: a first end of the grinder drive shaft; a second end of the grinder drive shaft opposite to the first end; and a longitudinal axis defined therebetween that is parallel with a longitudinal axis of the vehicle defined between the first end and the second end of the vehicle. This exemplary embodiment or another exemplary embodiment may further include that wherein the PTO assembly comprises: a PTO pulley; a PTO drive shaft operably engaged with the PTO pulley and the belt drive assembly; and a PTO belt operably engaged with the PTO pulley and a PTO assembly of the vehicle. This exemplary embodiment or another exemplary embodiment may further include that wherein the belt drive assembly comprises: a first belt drive pulley operably engaged with the PTO drive shaft; a second belt drive pulley operably engaged with the grinder drive shaft and opposite to the first belt drive pulley; at least one belt operably engaged with the first belt drive pulley and the second drive pulley; and a belt tensioner operably engaged with the at least one belt to maintain the at least one belt with the first belt drive pulley and the second belt drive pulley at a predetermined tension. This exemplary embodiment or another exemplary embodiment may further include that wherein the belt drive assembly comprises: a first belt drive pulley operably engaged with the PTO drive shaft; a second belt drive pulley operably engaged with the grinder drive shaft and opposite to the first belt drive pulley; a plurality of belts operably engaged with the first belt drive pulley and the second drive pulley; and a belt tensioner operably engaged with the plurality of belts to maintain the plurality of belts with the first belt drive pulley and the second belt drive pulley at a predetermined tension. This exemplary embodiment or another exemplary embodiment may further include a first driving axis defined by a PTO drive shaft of the PTO assembly that is parallel with the longitudinal axis of the vehicle; and a second driving axis defined by the grinder drive shaft this is parallel with the first driving axis and the longitudinal axis of the vehicle. This exemplary embodiment or another exemplary embodiment may further include that wherein the body further comprises: a first housing operably engaged with the chassis and defining a first chamber sized and configured to house the PTO pulley and a portion of the PTO drive shaft; and a second housing operably engaged with the chassis and the first housing and defining a second chamber sized and configured to house the belt drive assembly, another portion of the PTO drive shaft, and a portion of the grinder drive shaft. This exemplary embodiment or another exemplary embodiment may further include that wherein the belt drive assembly further comprises: a support member of the belt tensioner operably engaged with the second housing of the body; at least one support arm of the belt tensioner rotatably engaged with the support member; at least one engagement member of the belt tensioner rotatably engaged with the at least one support arm that is configured to engaged with the at least one belt; at least one upright support operably engaged with the second housing of the body; and at least one biaser operably engaged with the support member, the at least one support arm, and the at least one upright support to maintain the predetermined tension between the at least one support arm, the at least one engagement member, and the at least one belt. This exemplary embodiment or another exemplary embodiment may further include that wherein the belt drive assembly further comprises: a plurality of notches defined in the at least one upright support; wherein the at least one biaser is configured to be selectively operatively engaged with a notch of the plurality of notches to maintain the predetermined tension between the at least one support arm, the at least one engagement member, and the at least one belt. This exemplary embodiment or another exemplary embodiment may further include that wherein a portion of the grinder wheel of the stump grinder is visible from an operator seat of the vehicle. This exemplary embodiment or another exemplary embodiment may further include that wherein the body of the stump grinder further comprises: a first end; a second end opposite to the first end and defining an opening thereof; and a chamber defined between the first end and the second end; wherein a first portion of the grinder wheel is disposed inside of the chamber and a second portion of the grinder wheel passes through the opening outside of the chamber. This exemplary embodiment or another exemplary embodiment may further include that wherein the stump grinder further comprises: at least one kickstand assembly rotatably engaged with the body; wherein the at least one kickstand assembly is selectively moveable between a supported position and an unsupported position for supporting the stump grinder. This exemplary embodiment or another exemplary embodiment may further include that wherein the stump grinder further comprises: a front end positioned proximate to the body; a rear end positioned proximate to the chassis and opposite to the front end; and a push blade assembly operatively engaged with the body; wherein the push blade assembly is independently rotatable on the body between the front end of the stump grinder and the rear end of the stump grinder. This exemplary embodiment or another exemplary embodiment may further include that wherein the push blade assembly comprises: a push blade operably engaged with the body, the push blade having a first end, a second end opposite to the first end, and a longitudinal axis defined therebetween; at least one attachment mechanism operably engaging the push blade with the body; and at least one actuator operably engaged with the chassis and the push blade for rotating the push blade between the front end of the stump grinder and the rear end of the stump grinder. This exemplary embodiment or another exemplary embodiment may further include that wherein the longitudinal axis of the push blade is orthogonal to a plane of rotation of the grinder wheel.

In yet another aspect, an exemplary embodiment of the present disclosure may provide a method of cutting a stump from a ground surface. The method comprises steps of: engaging a stump grinder with a vehicle; introducing a grinder wheel of the stump grinder to the stump; initiating rotation of the grinder wheel via a drive assembly of the stump grinder, wherein the drive assembly includes a belt drive assembly; and cutting the stump from the ground surface.

This exemplary embodiment or another exemplary embodiment may further include steps of engaging a power takeoff (PTO) of the drive assembly with a power takeoff of the vehicle; engaging the belt drive assembly with the power takeoff of the drive assembly; and engaging the belt drive assembly of the drive assembly with a grinder drive shaft operably engaged with the grinder wheel. This exemplary embodiment or another exemplary embodiment may further include steps of generating a first driving axis, via the PTO of the vehicle, along a PTO drive shaft of a PTO assembly of the drive assembly; and generating a second driving axis, via the belt drive assembly of the drive assembly, along a grinder drive shaft operably engaged with the grinder wheel. This exemplary embodiment or another exemplary embodiment may further include that wherein the step of generating the first driving axis further includes that the first driving axis is parallel with a longitudinal axis of the vehicle; and wherein the step of generating the second driving axis further includes that the second driving axis is parallel with the longitudinal axis of the vehicle and the first driving axis.

In yet another aspect, an exemplary embodiment of the present disclosure may provide a stump grinder for attachment with a vehicle. The stump grinder comprises a chassis operably engaged with the vehicle at one of the first end and the second end. The stump grinder comprises a body operably engaged with the chassis. The stump grinder comprises a front end positioned proximate to the body. The stump grinder comprises a rear end positioned proximate to the chassis and opposite to the front end. The stump grinder comprises a grinder wheel operably engaged with the body. The stump grinder comprises a drive assembly operably engaged with the grinder wheel and the body. The stump grinder comprises a push blade assembly operatively engaged with the body.

This exemplary embodiment or another exemplary embodiment may further include that wherein the push blade assembly comprises: a push blade operably engaged with the body, the push blade having a first end, a second end opposite to the first end, and a longitudinal axis defined therebetween; wherein the longitudinal axis of the push blade is orthogonal to a plane of rotation of the grinder wheel. This exemplary embodiment or another exemplary embodiment may further include at least one mounting bracket operably engaged with one or both of the chassis and the body; wherein the push blade assembly operably engages with the at least one mounting bracket. This exemplary embodiment or another exemplary embodiment may further include that wherein the push blade assembly further comprises: at least one actuator having a cylinder operably engaged with the chassis and a piston rod operably engaged with the push blade; wherein the at least one actuator is adapted to rotate the push blade between the front end of the body and the rear end of the body. This exemplary embodiment or another exemplary embodiment may further include that wherein the push blade assembly further comprises: at least one pivot arm having a first end operably engaged with one of the chassis and the body and a second end operably engaged with the push blade and the at least one actuator and opposite to the first end. This exemplary embodiment or another exemplary embodiment may further include a first mounting bracket operably engaged with the chassis; and wherein the push blade assembly further comprises: an actuator having a cylinder operably engaged with the first mounting bracket and a piston rod operably engaged with the push blade; wherein the actuator is adapted to rotate the push blade between the front end of the body and the rear end of the body. This exemplary embodiment or another exemplary embodiment may further include a second mounting bracket operably engaged with the body positioned vertically below the first mounting bracket; and a third mounting bracket operably engaged with the body positioned adjacent to the second mounting bracket; wherein the push blade assembly further comprises: a push blade mounting bracket operably engaged with the push blade; a first pivot arm having a first end operably engaged with the second mounting bracket and a second end operably engaged with the push blade and the actuator and opposite to the first end; and a second pivot arm having a first end operably engaged with the third mounting bracket and a second end operably engaged with the push blade. This exemplary embodiment or another exemplary embodiment may further include that wherein the push blade assembly further comprises: a first attachment mechanism operably engaging each of the cylinder of the actuator and the first mounting bracket with one another; a second attachment mechanism operably engaging each of the first pivot arm and the second mounting bracket with one another; a third attachment mechanism operably engaging each of the first pivot arm, the piston rod of the actuator, and the push blade mounting bracket with one another; and a fourth attachment mechanism operably engaging each of the second pivot arm and the third mounting bracket with one another. This exemplary embodiment or another exemplary embodiment may further include that wherein the body of the stump grinder further comprises: a first end; a second end opposite to the first end and defining an opening thereof; and a chamber defined between the first end and the second end; wherein a first portion of the grinder wheel is disposed inside of the chamber and a second portion of the grinder wheel passes through the opening outside of the chamber and is visible from an operator seat of the vehicle. This exemplary embodiment or another exemplary embodiment may further include that wherein the drive assembly of the stump grinder further comprises: a power takeoff (PTO) assembly operably engaged with a power takeoff of the vehicle; and a belt drive assembly operably engaged with the PTO assembly; and a grinder drive shaft operably engaged with the belt drive assembly and the grinder wheel, the grinder drive shaft having a first end, a second end opposite to the first end, and a longitudinal axis defined therebetween that is parallel with the longitudinal axis of the vehicle. This exemplary embodiment or another exemplary embodiment may further include that wherein the PTO assembly comprises: a PTO pulley; a PTO drive shaft operably engaged with the PTO pulley and the belt drive assembly; and a PTO belt operably engaged with the PTO pulley and a PTO assembly of the vehicle. This exemplary embodiment or another exemplary embodiment may further include that wherein the belt drive assembly comprises: a first belt drive pulley operably engaged with the PTO drive shaft; a second belt drive pulley operably engaged with the grinder drive shaft and opposite to the first belt drive pulley; at least one belt operably engaged with the first belt drive pulley and the second drive pulley; and a belt tensioner operably engaged with the at least one belt to maintain the at least one belt with the first belt drive pulley and the second belt drive pulley at a predetermined tension. This exemplary embodiment or another exemplary embodiment may further include that wherein the belt drive assembly comprises: a first belt drive pulley operably engaged with the PTO drive shaft; a second belt drive pulley operably engaged with the grinder drive shaft and opposite to the first belt drive pulley; a plurality of belts operably engaged with the first belt drive pulley and the second drive pulley; and a belt tensioner operably engaged with the plurality of belts to maintain the plurality of belts with the first belt drive pulley and the second belt drive pulley at the predetermined tension. This exemplary embodiment or another exemplary embodiment may further include that wherein the stump grinder further comprises: a first driving axis defined by the PTO drive shaft that is parallel with a longitudinal axis of the vehicle; and a second driving axis defined by the grinder drive shaft this is parallel with the first driving axis and the longitudinal axis of the vehicle. This exemplary embodiment or another exemplary embodiment may further include that wherein the stump grinder further comprises: at least one kickstand assembly rotatably engaged with the body wherein the at least one kickstand assembly is selectively moveable between a supported position and an unsupported position for supporting the stump grinder.

In yet another aspect, an exemplary embodiment of the present disclosure may provide a method of cutting a stump from a ground surface. The method comprises steps of: engaging a stump grinder with a vehicle; introducing a grinder wheel of the stump grinder to the stump; initiating rotation of the grinder wheel via a drive assembly of the stump grinder, wherein the grinder wheel rotates in a plane that is orthogonal to a longitudinal axis defined by the vehicle; cutting the stump from the ground surface; and rotating a push blade of a push blade assembly between a front end of the stump grinder and a rear end of the stump grinder.

This exemplary embodiment or another exemplary embodiment may further include a step of determining a height of the stump relative to the ground surface, via the push blade, subsequent to the step of cutting the stump from the ground surface. This exemplary embodiment or another exemplary embodiment may further include a step of removing cut stump material, via the push blade, subsequent to the step of cutting the stump from the ground surface. This exemplary embodiment or another exemplary embodiment may further include steps of disengaging the stump grinder from the vehicle; and supporting the stump grinder, via the push blade assembly, independently of the vehicle.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 6 is a partial rear elevation view of the stump grinder.

Similar numbers refer to similar parts throughout the drawings.

DETAILED DESCRIPTION

Figure 1:
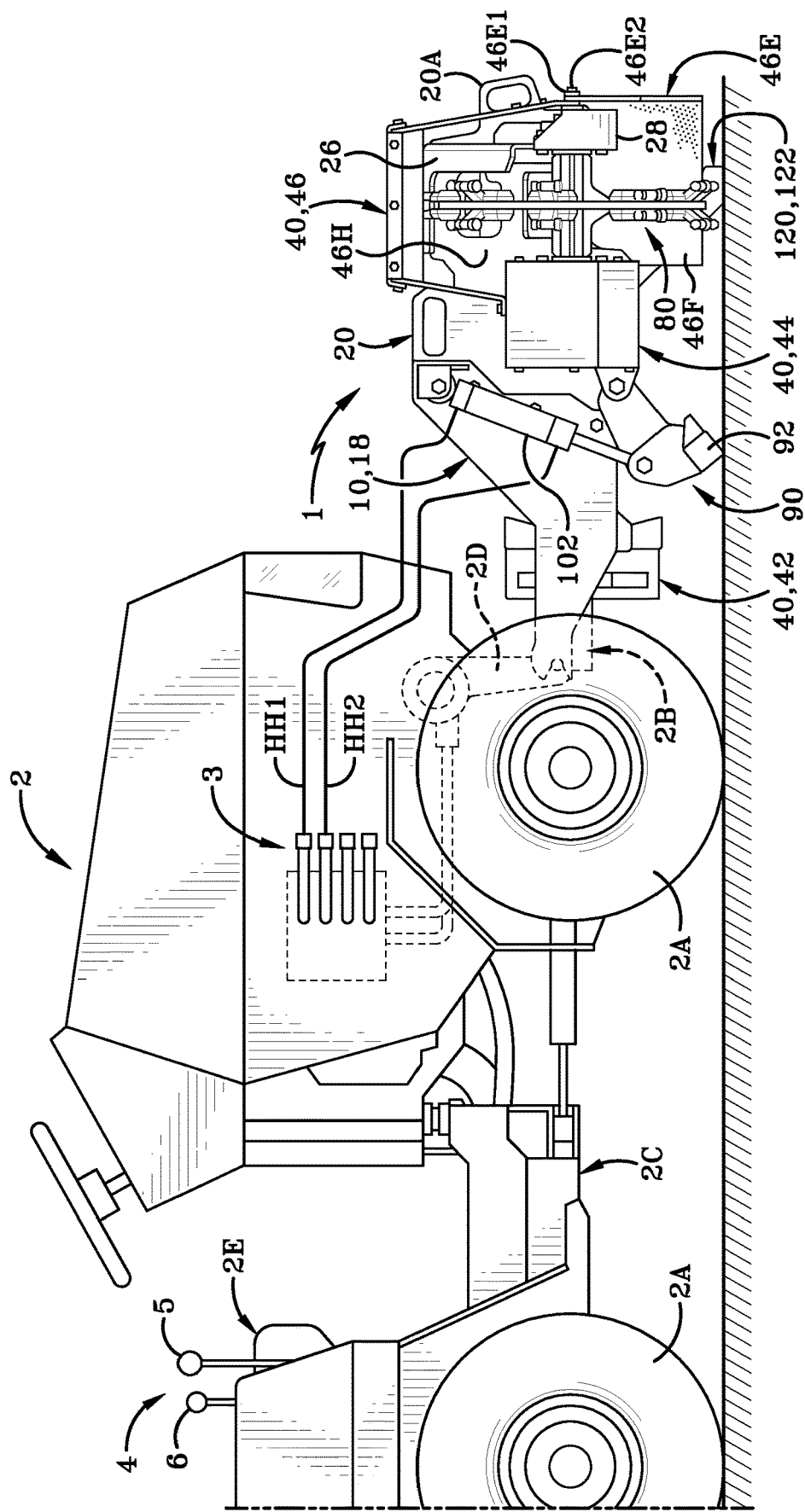
FIG. 1 is a first side elevation view of a stump grinder in accordance with an aspect of the present disclosure, wherein the stump grinder illustrated is operatively engaged with a tractor.
Figure 2:
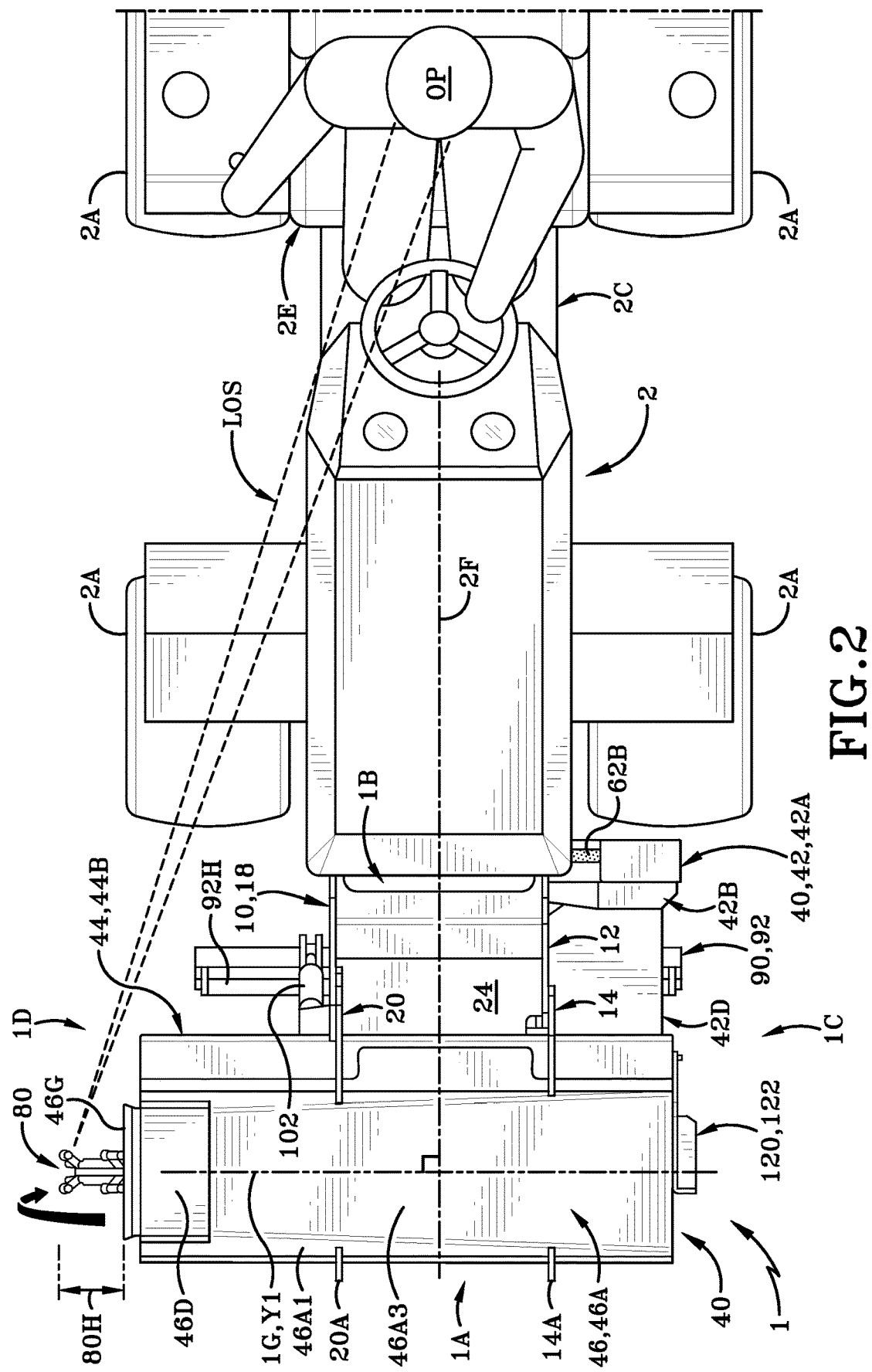
FIG. 2 is a top plan view of the stump grinder and the tractor, wherein an operator is enabled to view a portion of a grinder wheel of the stump grinder from an operator seat of the tractor.
Figure 3:
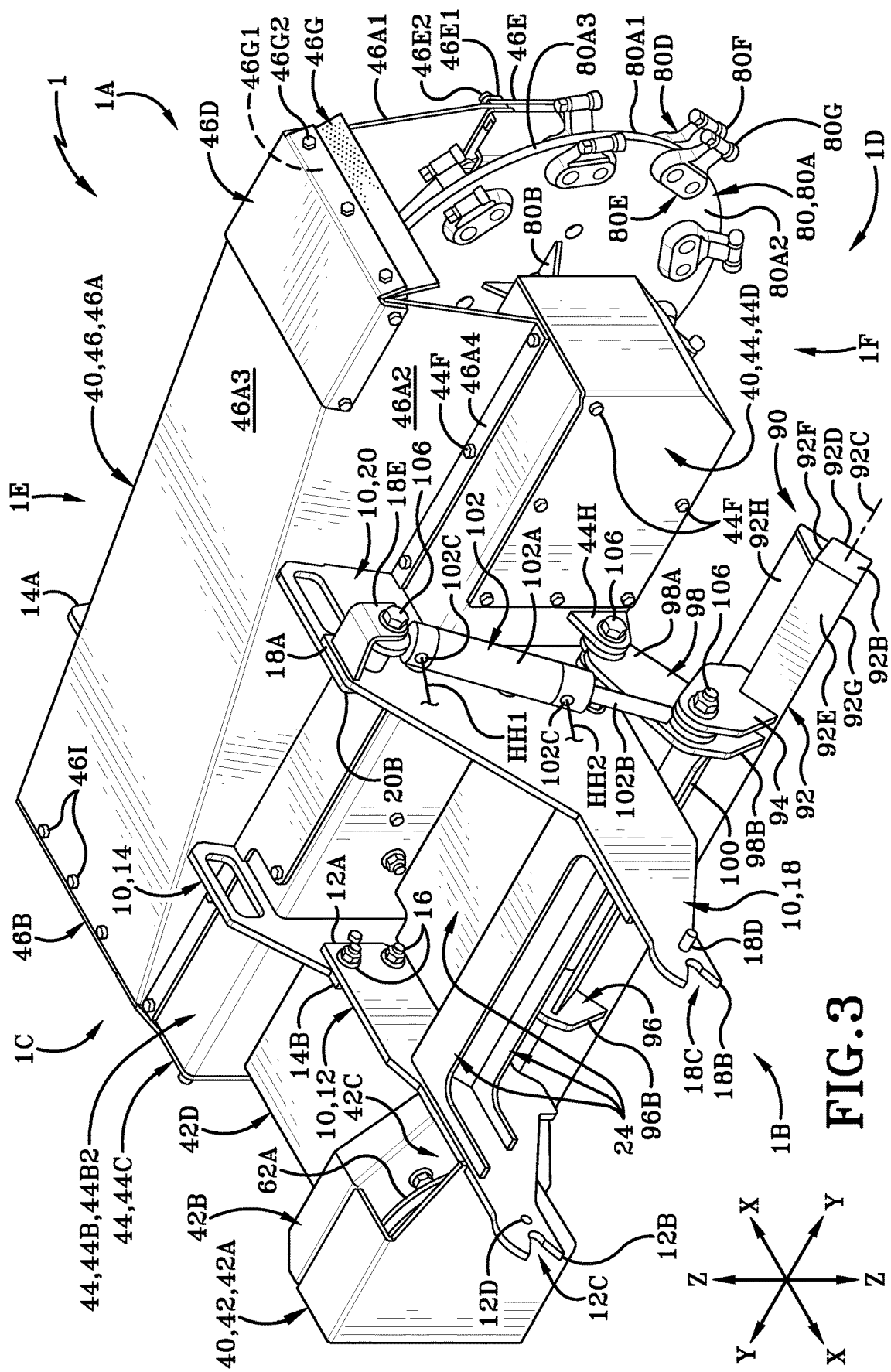
FIG. 3 is a top, rear, first side elevation view of the stump grinder in accordance with an aspect of the present disclosure.
Figure 4:
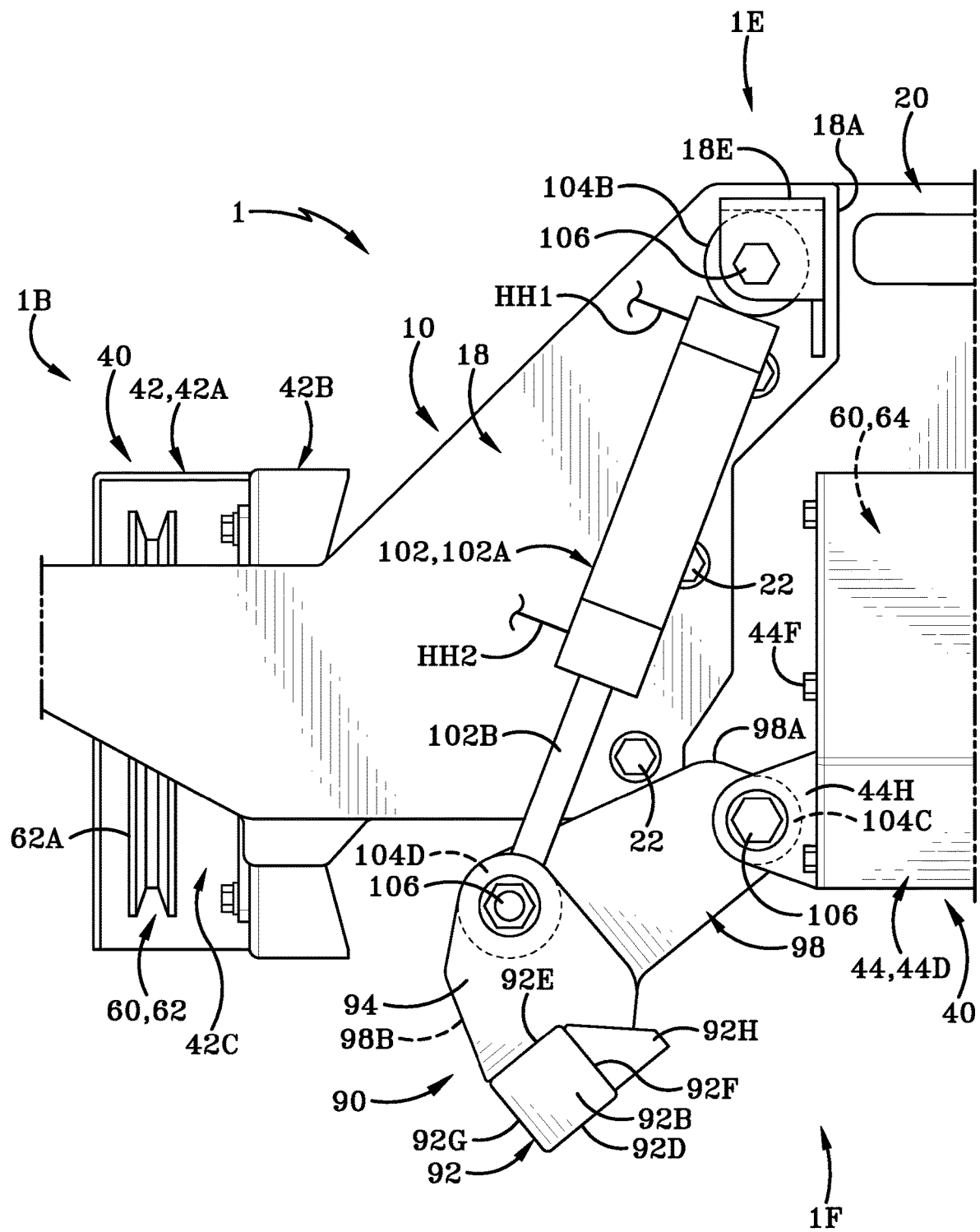
FIG. 4 is a partial first side elevation view of the stump grinder, wherein a push blade assembly is provided between a stored position and an operating position.

An outdoor power equipment device, which may also be referred to as a stump grinder, is generally shown throughout the figures at 1. Referring to FIGS. 1-3, the stump grinder 1 includes a first end or front end 1A, a second end or rear end 1B opposite to the front end 1A, and a longitudinal axis "X" defined therebetween. Stump grinder 1 also includes a first side or left side 1C, a second side or right side 1D opposite to the first side 1C, and a transverse axis "Y1" defined therebetween. Stump grinder 1 also includes a third end or top end 1E, a fourth end or bottom end 1F opposite to the top end 1E, and a vertical axis "Z" defined therebetween. Referring to FIG. 2, the stump grinder 1 also defines an orientation 1G that is parallel with the transverse axis "Y1" based on the configuration of the stump grinder 1. Such use and purpose of the orientation 1G along with the transverse axis "Y1" is described in more detail below.

It should be understood that the terms "front", "rear", "top", "bottom", "left", and "right" and other similar derivative terms are used to described the orientation of the stump grinder 1 illustrated in the attached figures and should in no way be considered to limit the orientation that the stump grinder may be utilized. In addition, the use of the directional terms "front", "rear", "top", "bottom", "left", and "right" and other similar derivative terms is taken in perspective of FIG. 3 (i.e., viewing the stump grinder 1 from the rear end 1B).

Referring to FIG. 1, the stump grinder 1 is configured to operably engage with a drivable outdoor power equipment device shown generally at 2, which may also be referred to as a tractor 2, including at least on ground engaging wheel 2A. The tractor may include a power takeoff (PTO) connector 2B that connects with the stump grinder 1. In one particular embodiment, stump grinder 1 is offset forwardly from a forward ground engaging wheel 2A on tractor 2. One exemplary tractor 2 for use with stump grinder 1 is a Ventrac compact tractor commercially available for sale and known in the industry as a Ventrac 4500 tractor. The tractor 2 may include an all-wheel drive system in addition to an articulating tractor frame 2C. The tractor 2 may also include a set of attachment hitch arms 2D that are configured to engage the stump grinder 1 for stump grinding operation, which is described in more detail below. The tractor 2 may also include an operator seat 2E that is configured to enable an operator of the tractor 2 to use and operate the tractor 2 and the stump grinder 1. The tractor 2 may also include a longitudinal axis or direction 2F in which the tractor 2 drives forwardly and backwardly along the longitudinal direction 2F. In the illustrated embodiment, the orientation 1G along with the transverse axis "Y1" of the stump grinder 1 is perpendicular with the longitudinal direction 2F of the tractor 2.

Still referring to FIG. 1, tractor 2 may further include a mechanical power assembly 3 that is configured to operably engage with the stump grinder 1. An operator of the tractor 2 may be able to operate the mechanical power assembly 3 to articulate and/or manipulate certain components during operation of the stump grinder 1, which is described in more detail below. In the illustrated embodiment, the mechanical power assembly 3 is a hydraulic assembly that operably engages with the stump grinder 1 to articulate and/or manipulate certain components during operation of the stump grinder 1. In other exemplary embodiments, a tractor may include any suitable power assembly that operably engages with a stump grinder to articulate and/or manipulate certain components during operation of the stump grinder. Examples of suitable assemblies used to articulate and/or manipulate certain components during operation of a stump grinder include pneumatic assemblies, electrical assemblies, and other suitable assemblies of the like configured to articulate and/or manipulate certain components during operation of the stump grinder.

Still referring to FIG. 1, tractor 2 may further include a control system 4 that is operatively engaged with the mechanical power assembly 3 and other on-board assemblies of tractor 2. The control system 4 may include a first control lever 5 that operatively controls certain components and/or assemblies on the stump grinder 1 operatively engaged with the mechanical power assembly 3. Such use of the first control lever 5 during a stump grinding operation is described in more detail below. The control system 4 may include a second control lever 6 that operatively control certain components and/or assemblies of the mechanical power assembly 3. Such use of the second control lever 6 during a stump grinding operation is described in more detail below.

Referring to FIG. 3, the stump grinder 1 includes a chassis 10 that operably engages with the tractor 2. Specifically, the chassis 10 of the stump grinder 1 operably engages with the attachment hitch arms 2D of the tractor 2. In the illustrated stump grinder 1, the chassis 10 includes a first control arm 12 that operably engages with a first attachment hitch arm 2D of the tractor 2. The first control arm 12 includes a first end 12A, a second end 12B opposite to the first end 14A, and a longitudinal axis defined therebetween. The first control arm 12 also includes a notch 12C that is defined at the second end 12B of the first control arm 12 and extends from the second end 12B towards the first end 12A. The first control arm 12 also includes an attachment member 12D that extends laterally away from the first control arm 12 in a transverse direction. The attachment member 12D is positioned proximate to the second end 12B and the notch 12C. In the illustrated stump grinder 1, the notch 12C and the attachment member 12D enable the first attachment hitch arm 2D to operably engaged with the first control arm 12 when an operator desires to use the stump grinder 1 with the tractor 2.

Still referring to FIG. 3, the stump grinder 1 also includes a first support frame 14 that operably engaged with the first control arm 12. The first support frame 14 includes a first end 14A, a second end 14B opposite to the first end 14A, and a longitudinal axis defined therebetween. Upon assembly of the chassis 10, the second end 14B of the first support frame 14 is positioned adjacent to and/or proximate to the first end 12A of the first control arm, and the first end 14A of the first support frame 14 is positioned at a distance away from the second end 12B of the first control arm 12. The first support frame 14 may define a first opening defined proximate to the first end 14A of the first support frame 14 (see FIG. 1). The first support frame 14 may also define a second opening defined proximate to the second end 14B of the first support frame 14. The first and second openings of the first support frame 14 may be used as anchoring positions for attaching various support devices (e.g., rope, tie-downs, and various support devices of the like) to the stump grinder 1 for securing and maintaining the stump grinder 1 on a vehicle during transport.

Still referring to FIG. 3, the chassis 10 also includes a first set of attachment mechanisms 16 that operably engage the first control arm 12 and the first support frame 14 with one another. Each attachment mechanism of the first set of attachment mechanisms 16 includes a connector that operably engages with a nut to collectively attach the first control arm 12 and the first support frame 14 with one another. As such, suitable features may be defined and/or provided in each of the first control arm 12 and the first support frame 14 (e.g., openings defined in the first control arm 12 and the first support frame 14) to enable connectors of the first set of attachment mechanisms 16 to collectively attach the first control arm 12 and the first support frame 14 with one another. In other exemplary embodiments, any suitable mechanisms and/or components may be used to operably engage a first control arm and a first support frame of a stump grinder with one another.

Still referring to FIG. 3, the chassis 10 also includes a second control arm 18 that is substantially similar to the first control arm 12 in which the second control arm 18 is positioned in a mirrored orientation to the first control arm 12. Specifically, a first end 18A, a second end 18B, a notch 18C, and an attachment member 18D are substantially similar to the first end 12A, the second end 12B, the notch 12C, and the attachment member 12D of the first control arm 12. Similar to the first control arm 12, the second control arm 18 operably engages with a second attachment hitch arm 2D of the tractor 2. In the illustrated chassis 10, the second control arm 18 is parallel with the first control arm 12 relative to the longitudinal axis of the stump grinder 1 that extends between the front and rear ends 1A, 1B.

Still referring to FIG. 3, the second control arm 18 also includes a L-shaped mounting bracket 18E that extend outwardly from the second control arm 18 at the first end 18A. Such use and purpose of the mounting bracket 18E is described in more detail below.

Still referring to FIG. 3, the chassis 10 also includes a second support frame 20 that is substantially similar to the first support frame 14 in which the second support frame 20 is positioned in a mirrored orientation to the first support frame 14. Specifically, a first end 20A, a second end 20B, a first opening, and a second opening of the second support frame 20 are substantially similar to the first end 14A, the second end 14B, the first opening, and the second opening of the first control arm 12. Similar to the first support frame 14, the second support frame 20 operably engages with the second control arm 18. In the illustrated chassis 10, the second support frame 20 is parallel with the first support frame 14 relative to the longitudinal axis of the stump grinder 1 that extends between the front and rear ends 1A, 1B. The first and second openings of the second support frame 20 may also be used as anchoring positions for attaching various support devices (e.g., rope, tie-downs, and various support devices of the like) to the stump grinder 1 for securing and maintaining the stump grinder 1 on a vehicle during transport.

Still referring to FIG. 3, the chassis 10 also includes a second set of attachment mechanisms 22 that operably engages the second control arm 18 and the second support frame 20 with one another. Each attachment mechanism of the second set of attachment mechanisms 22 includes a connector that operably engages with a nut to collectively attach the second control arm 18 and the second support frame 20 with one another. As such, suitable features may be defined and/or provided in each of the second control arm 18 and the second support frame 20 (e.g., openings defined in the second control arm 18 and the second support frame 20) to enable connectors of the second set of attachment mechanisms 22 to collectively attach the second control arm 18 and the second support frame 20 with one another. In other exemplary embodiments, any suitable mechanisms and/or components may be used to operably engage a first control arm and a first support frame of a stump grinder with one another.

Still referring to FIG. 3, the chassis 10 also includes a first cross member 24 that operably engages with the first control arm 12, the first support frame 14, the second control arm 18, and the second support frame 20. Upon assembly of the chassis 10, first cross member 24 is positioned between the first control arm 12 and the second control arm 18 and is positioned between the first support frame 14 and the second support frame 20. Still referring to FIG. 3, the first cross member 24 also includes a first portion that extends longitudinally along the first control arm 12 and the second control arm. The first cross member 24 also includes a second portion that extends from the first portion and bifurcate into first and second parts where the first part is vertically positioned above the second part. The first cross member 24 may provide lateral stability and support in a transverse direction between each of the first control arm 12, the first support frame 14, the second control arm 18, and the second support frame 20.

Referring to FIG. 1, the chassis 10 may also include a second cross member 26 that operably engages with the first support frame 14 and the second support frame 20. Specifically, the second cross member 26 operably engages with the first support frame 14 and the second support frame 20 proximate to the first ends 14A, 20A of the first and second support frames 20. In the illustrated chassis 10, the second cross member 26 is positioned orthogonal to the longitudinal axes of the first support frame 14 and the second support frame 20.

Still referring to FIG. 1, the chassis 10 may also include a third cross member 28 that operably engages with the first support frame 14 and the second support frame 20. Specifically, the third cross member 28 operably engages with the first support frame 14 and the second support frame 20 proximate to the first ends 14A, 20A of the first and second support frames 20. The third cross member 28 also operably engages with the second cross member 26. In the illustrated chassis 10, the third cross member 28 is positioned orthogonal to the longitudinal axes of the first support frame 14 and the second support frame 20 and is positioned parallel with a longitudinal axis of the second cross member 26.

Referring to FIG. 3, the stump grinder 1 also includes a main body 40 that operably engages with the chassis 10. As described in more detail below, the main body 40 is configured to house and hold various components and parts of the stump grinder 1 used to cut and grind a stump. The components and parts that form the main body 40 are described in more detail below.

Referring to FIG. 3, the stump grinder 1 includes a first or power takeoff (PTO) housing generally referred to at 42. The first housing 42 includes a first shroud 42A that operably engages with the first control arm 12. Still referring to FIG. 3, the first housing 42 also includes a second shroud 42B that operably engages with the first control arm 12 and the first shroud 42A. Particularly, a portion of the second shroud 42B operably engages with the first control arm 12 between the first end 12A and the first housing 42 proximate to the first housing 42. Another portion of the second shroud 42B also operably engages with the first shroud 42A. Still referring to FIG. 3, the first housing 42 also defines a chamber 42C between the first shroud 42A and the second shroud 42B that is sized and configured to house components and parts for a drive assembly of the stump grinder 1, which is described in more detail below.

Figure 10:
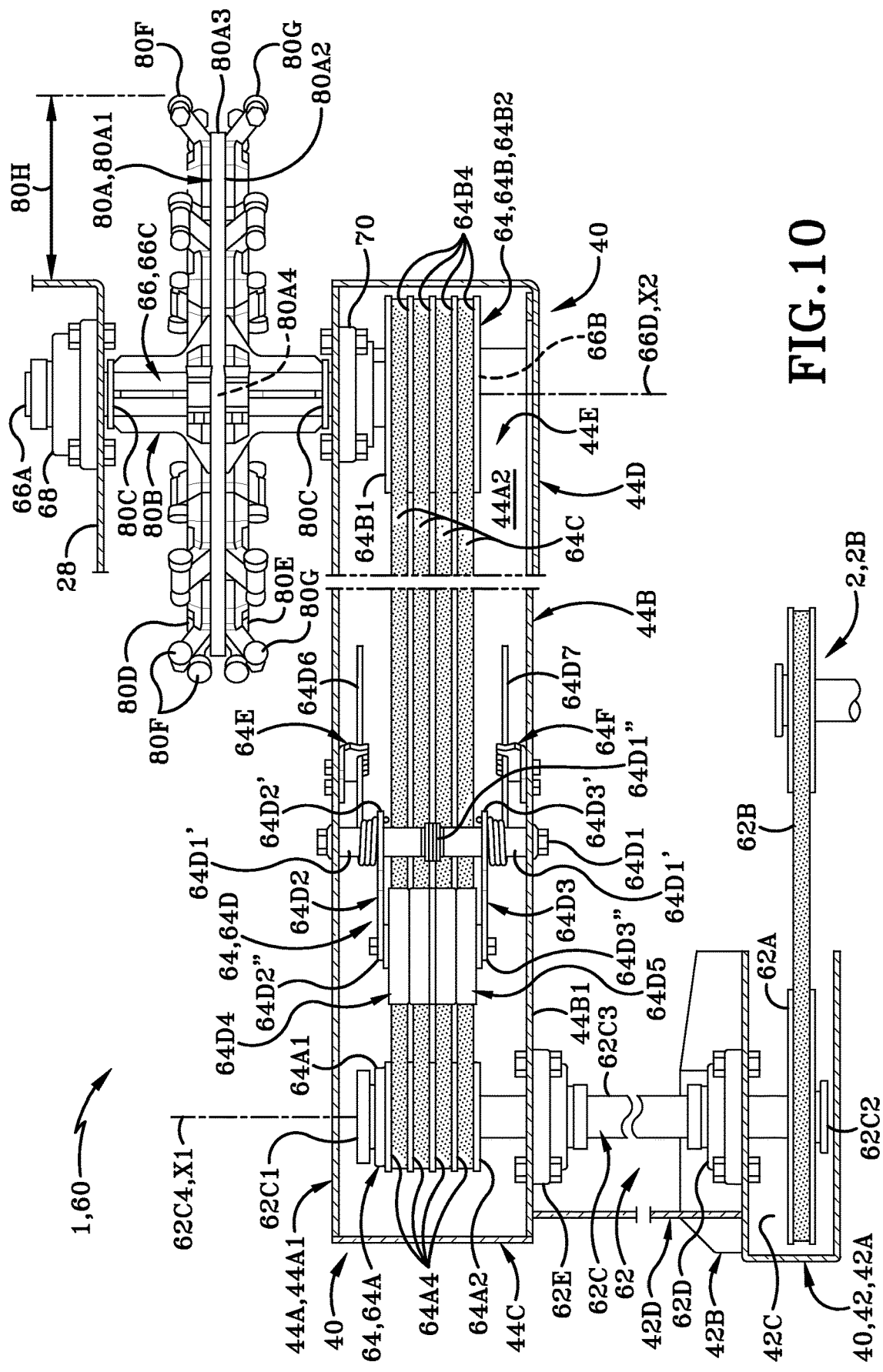
FIG. 10 is a partial sectional view of the stump grinder taken in the direction of line 10-10 as shown in FIG. 9.

Still referring to FIG. 3, the first housing 42 includes a third shroud 42D that operably engages with the second support frame 20. A portion of the third shroud 42D operably engages with the second support frame 20. Referring to FIG. 10, the third shroud 42D also defines an interior space collectively bound by a first end, a second end, a first side 42D3, and a second side of the third shroud 42D. The interior space may be sized and configured to house components and parts for a drive assembly of the stump grinder 1, which is described in more detail below.

Still referring to FIG. 3, the main body 40 also includes a second housing or belt drive assembly housing generally referred to at 44. In the illustrated main body 40, the second housing 44 operably engages with the first housing 42 and the first and second support frames 14, 20. Such components and parts that make up the second housing 44 is described in more detail below.

Figure 7:
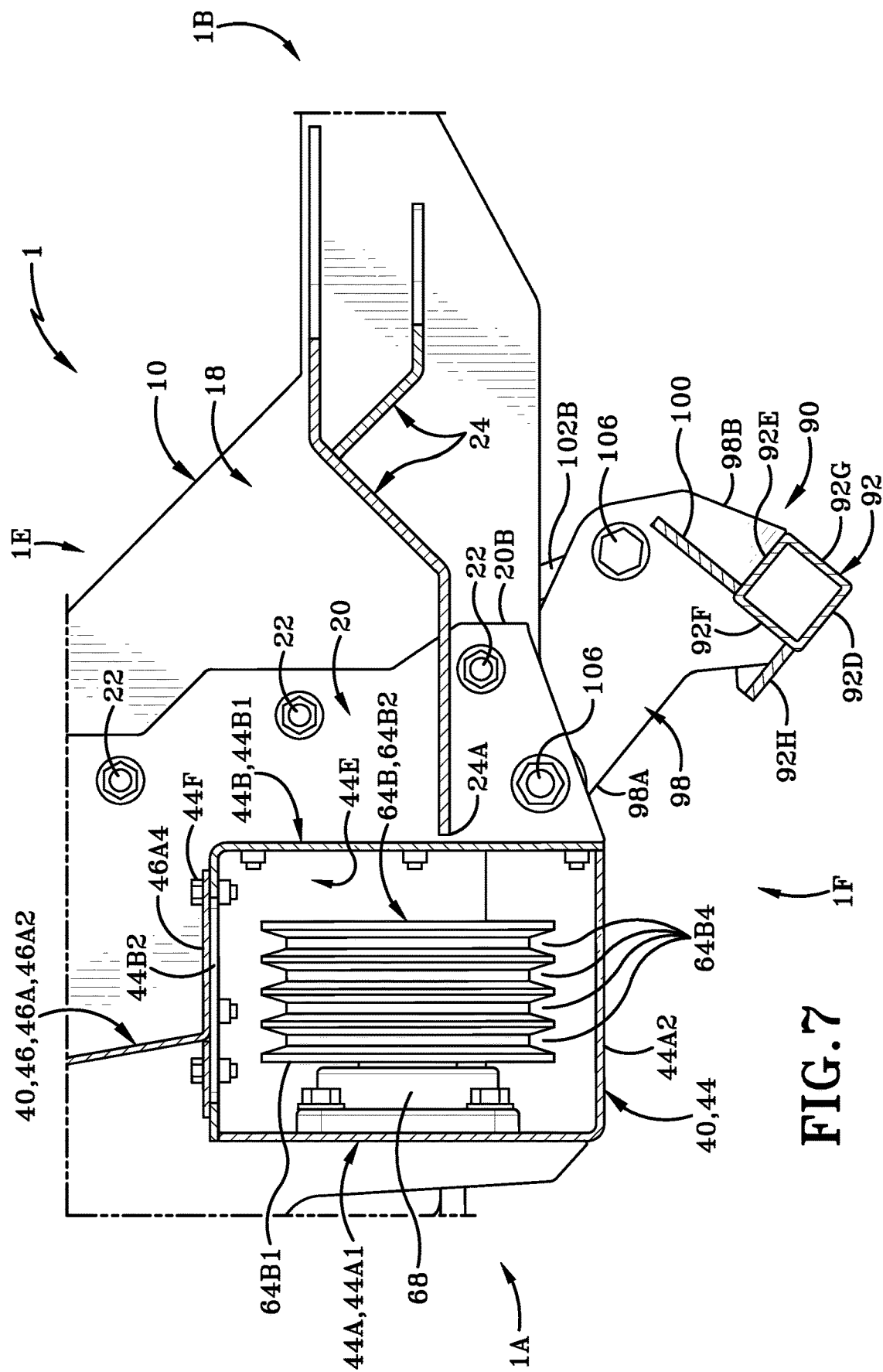
FIG. 7 is a partial sectional view of the stump grinder taken in the direction of line 7-7 as shown in FIG. 6.
Figure 8:
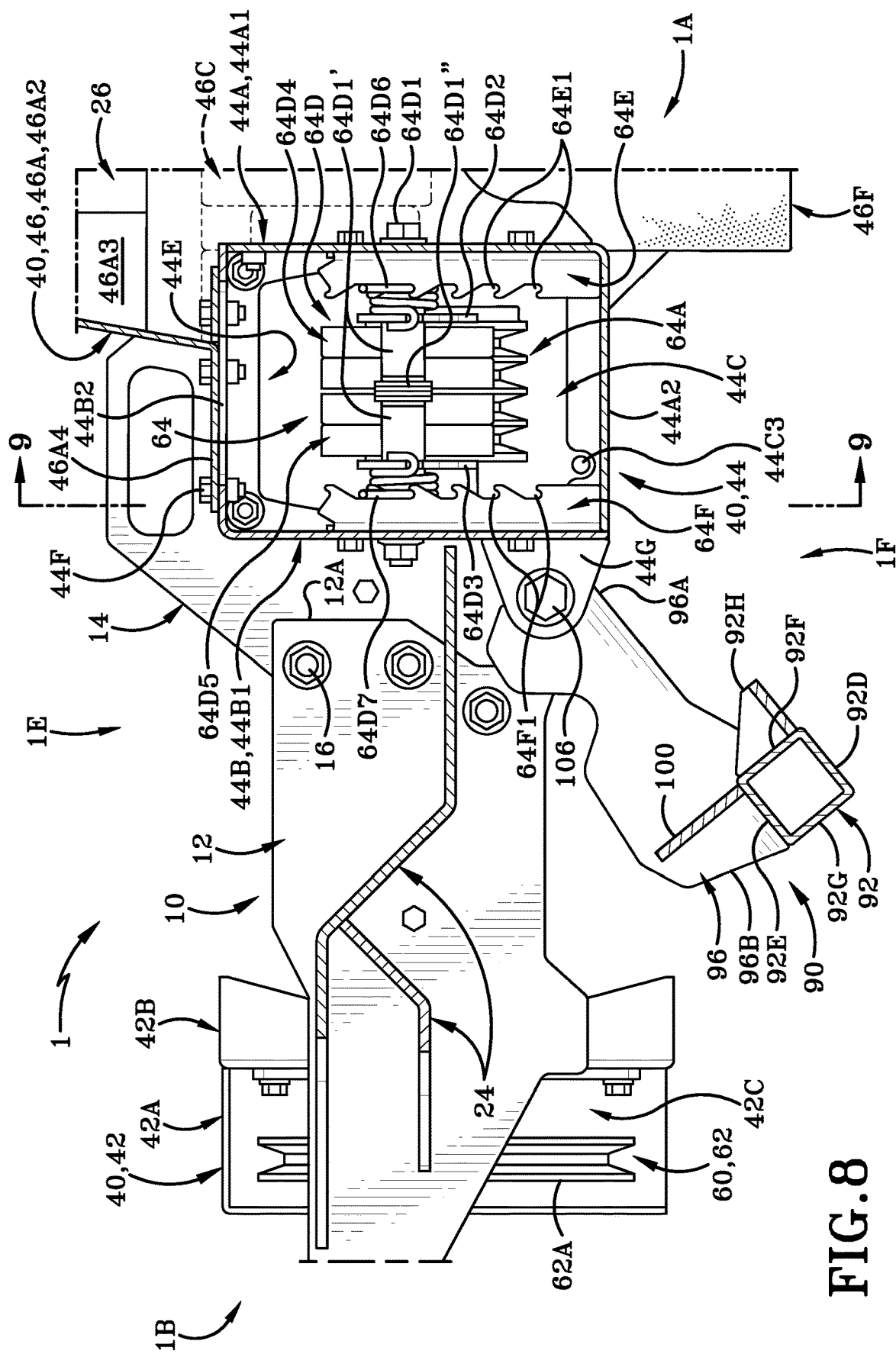
FIG. 8 is a partial sectional view of the stump grinder taken in the direction of line 8-8 as shown in FIG. 6.

The second housing 44 includes a first shroud 44A that operably engages with the first support frame 14 and the second support frame 20. Referring to FIGS. 7 and 8, the first shroud 44A includes a vertical wall 44A1 that extends vertically downward parallel with the vertical axis "Z" towards the fourth end 1F of the stump grinder 1. Still referring to FIGS. 7 and 8, the first shroud 44A includes a horizontal wall 44A2 that extends horizontally rearward parallel with the longitudinal axis "X" from the vertical wall 44A1 towards the second end 1B of the stump grinder 1. As illustrated, the vertical and horizontal walls 44A1, 44A2 collectively define an L-shaped configuration for the first shroud 44A.

The second housing 44 also includes a second shroud 44B that operably engages with the first support frame 14, the second support frame 20, and the first cross member 24. Referring to FIGS. 7 and 8, the second shroud 44B also has a vertical wall 44B1 that extends vertically upward parallel with the vertical axis "Z" towards the third end 1E of the stump grinder 1. Still referring to FIGS. 7 and 8, the second shroud 44B also includes a horizontal wall 44E32 that extends horizontally forward parallel with the longitudinal axis "X" from the vertical wall 44B1 towards the first end 1A of the stump grinder 1. As illustrated, the vertical and horizontal walls 4461, 44E32 collectively define an L-shaped configuration for the second shroud 44B.

Referring to FIGS. 7 and 8, the first and second shrouds 44A, 44B operably engage with one another upon assembly of the main body 40. In particular, the vertical wall 44A1 of the first shroud 44A operably engages with the horizontal wall 44B1 of the second shroud 44B, and the horizontal wall 44A2 of the first shroud 44A operably engages with the vertical wall 44B1 of the second shroud 44B.

Figure 5A:
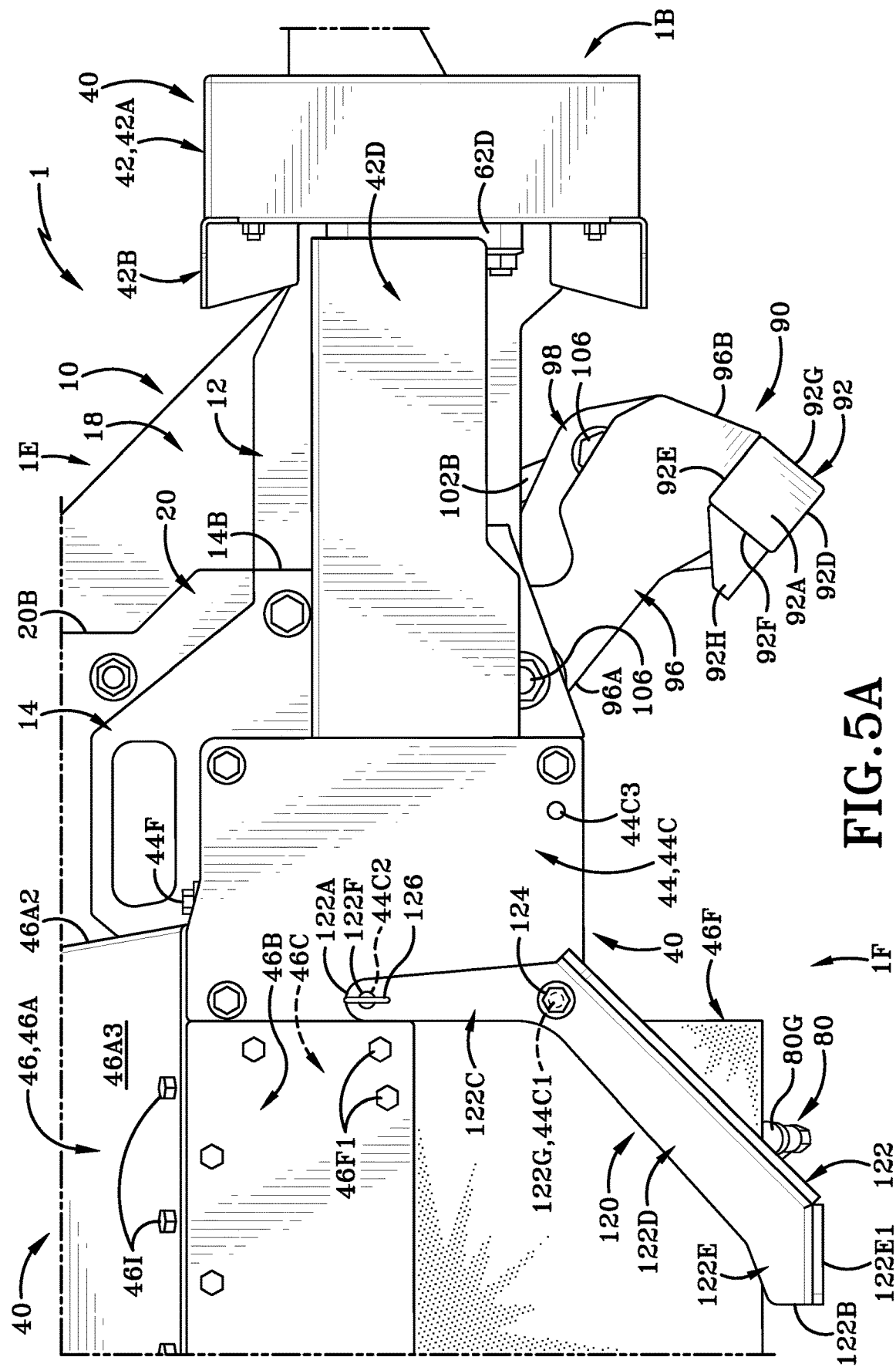
FIG. 5A is a partial second side elevation view of the stump grinder, wherein a kickstand assembly is provided in a support position.
Figure 5B:
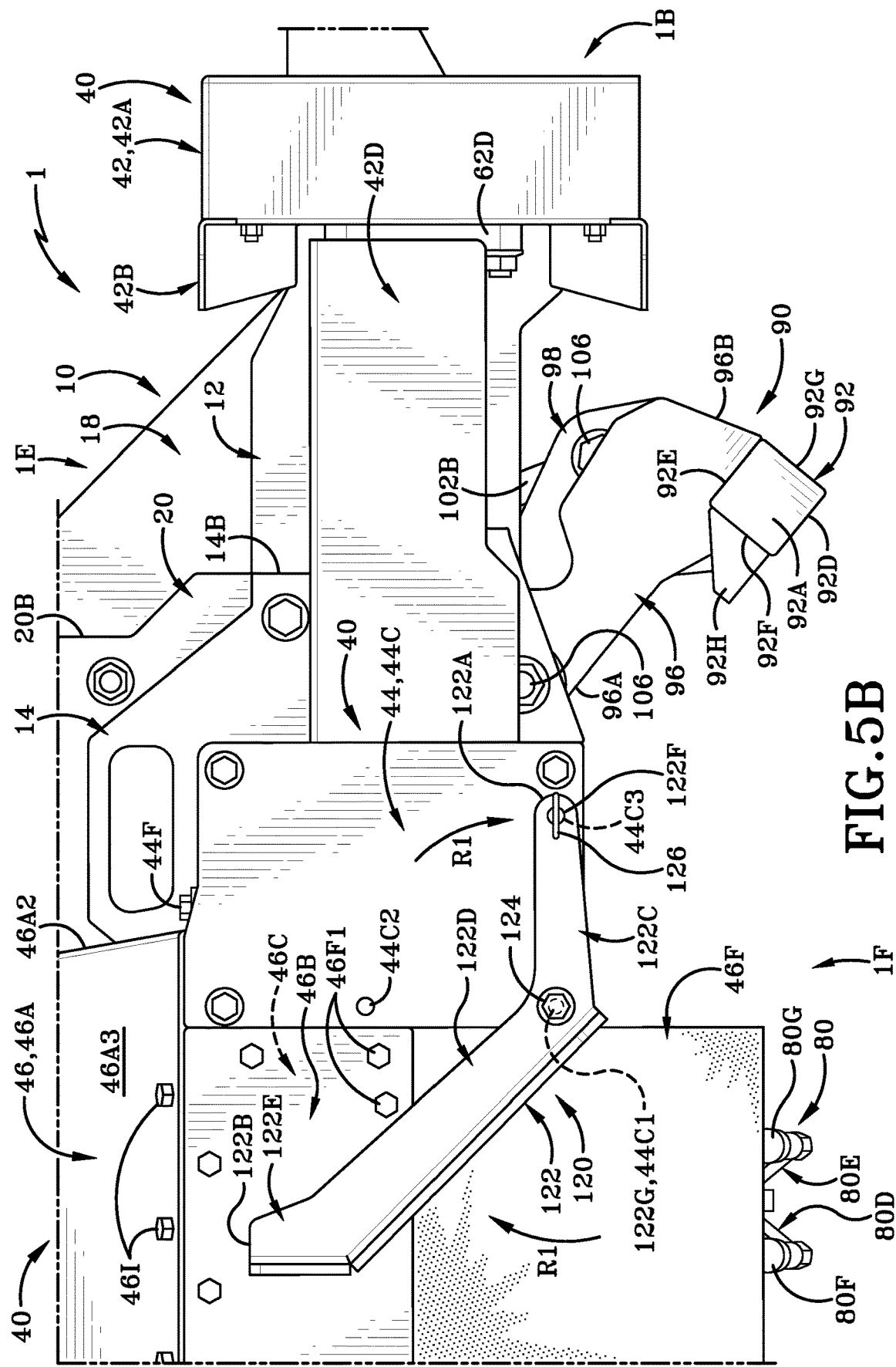
FIG. 5B is a partial second side elevation view of the stump grinder, wherein the kickstand assembly is provided in an unsupported position.

Referring to FIGS. 3 and 5A-5B, the second housing 44 also includes a third shroud 44C that operably engages with the first shroud 44A and the second shroud 44B. In particular, the third shroud 44C operably engages with the vertical wall 44A1 and the horizontal wall 44A2 of the first shroud 44A. The third shroud 44C also operably engages with the vertical wall 44B1 and the horizontal wall 44E32 of the second shroud 44B. Referring to FIGS. 5A and 5B, the third shroud 44C also defines a first aperture 44C1 that extends entirely through the third shroud 44C. In the illustrated embodiment, the first aperture 44C1 is defined between the first and second shrouds 44A, 44B proximate to the horizontal wall 44A2 of the first shroud 44A. The third shroud 44C also defines a second aperture 44C2 that extends entirely through the third shroud 44C. In the illustrated embodiment, the second aperture 44C2 is defined between the first and second shrouds 44A, 44B proximate to the vertical wall 44A1 of the first shroud 44A. The third shroud 44C also defines a third aperture 44C3 that extends entirely through the third shroud 44C. In the illustrated embodiment, the third aperture 44C3 is defined between the first and second shrouds 44A, 44B proximate to the horizontal wall 44A2 of the first shroud 44A. Such uses and purposes of the first aperture 44C1, the second aperture 44C2, and the third aperture 44C3 are described in more detail below.

Referring to FIGS. 3 and 10, the second housing 44 also includes a L-shaped fourth shroud 44D that operably engages with the first shroud 44A and the second shroud 44B opposite to the third shroud 44C. In particular, the fourth shroud 44D operably engages with the vertical wall 44A1 and the horizontal wall 44A2 of the first shroud 44A. The fourth shroud 44D also operably engages with the vertical wall 44B1 and the horizontal wall 44B2 of the second shroud 44B.

Referring to FIG. 10, the second housing 44 also defines a chamber 44E. In particular, the chamber 44E is collectively defined by the first shroud 44A, the second shroud 44B, the third shroud 44C, and the fourth shroud 44D when the second housing 44 is assembled. Such use and purpose of the chamber 44E is described in more detail below.

Referring to FIG. 3, each of the first shroud 44A, the second shroud 44B, the third shroud 44C, and the fourth shroud 44D are operably engaged with one another and components of the chassis 10 via locking mechanism 44F. Each locking mechanism of the set of locking mechanism 44F includes a connector that operably engages with a nut to collectively attach at least one shroud of the second housing 44 with at least another shroud of the second housing 44. As such, suitable features may be defined and/or provided in each of the first shroud 44A, the second shroud 44B, the third shroud 44C, and the fourth shroud 44D (e.g., openings defined in the first shroud 44A, the second shroud 44B, the third shroud 44C, and the fourth shroud 44D) to enable connectors of the first set of attachment mechanisms 16 to collectively attach at least one shroud of the second housing 44 with at least another shroud of the second housing 44. In other exemplary embodiments, any suitable mechanisms and/or components may be used to operably engage at least one shroud of a second housing with at least another shroud of the second housing.

In the illustrated stump grinder 1, at least one mounting bracket is operably engaged with the second housing 44. As illustrated in FIG. 6, a first mounting bracket 44G operably engages with the vertical wall 44B1 of the second shroud 44B proximate to the first control arm 12. As illustrated in FIG. 3, a second mounting bracket 44H also operably engages with the vertical wall 44B1 of the second shroud 44B proximate to the second control arm 18. In the illustrated embodiment, the first mounting bracket 44G and the second mounting bracket 44H are coaxial with one another on the second shroud 44B. Such uses and purposes of the first mounting bracket 44G and the second mounting bracket 44H are described in more detail below.

Referring to FIG. 3, the main body 40 also includes a third housing or grinder wheel housing 46 that operably engages with the first support frame 14, the second support frame 20, the first cross member 24, the second cross member 26, and the third cross member 28. Such components and parts of the third housing 46 are described in more detail below.

Still referring to FIG. 3, the third housing 46 includes a first shroud 46A that operably engages with the first support frame 14, the second support frame 20, and the second housing 44. The first shroud 46A includes a first upright wall 46A1 positioned proximate to the front end 1A of the stump grinder 1, a second upright wall 46A2 positioned proximate to the second housing 44 and opposite to the first upright wall 46A1, and a third connecting wall 46A3 positioned between the first upright wall 46A1 and the second upright wall 46A2. In the illustrated first shroud 46A, the first upright wall 46A1 operably engages with the first support frame 14 and the second support frame 20 at a first position proximate to the first ends 14A, 20A, and the second upright wall 46A2 operably engages with the first support frame 14 and the second support frame 20 at a second position proximate to the second ends 14B, 20B. Still referring to FIG. 3, a lip 46A4 extends rearwardly from the second upright wall 46A2 and operably engages with the horizontal wall 4462. In the illustrated first shroud 46A, the first upright wall 46A1, second upright wall 46A2, the third connecting wall 46A3, and the lip 46A4 is a single, unitary member forming the first shroud 46A. In other exemplary embodiments, a first upright wall, a second upright wall, a third connecting wall, and a lip of a third housing may be separate, individual parts forming the second housing.

Referring to FIG. 5A-5B, the third housing 46 also includes a second shroud 46B. As illustrated, the second shroud 46B operably engages with the third connecting wall 46A3 and a third shroud 46C (see FIG. 8) opposing the second shroud 46B.

Referring to FIG. 3, the third housing 46 also includes a fourth shroud 46D that operably engages with the first shroud 46A. In particular, the fourth shroud 46D operably engages with each of the first upright wall 46A1, the second upright wall 46A2, and the third connecting wall 46A3 proximate to the second side 1D of the stump grinder 1. Such use and purpose of the fourth shroud 46D is described in more detail below.

Referring to FIGS. 1, 3, and 5A-5B, the third housing 46 includes at least one shield assembly that operably engages with at least one of the first shroud 46A, the second shroud 46B, the third shroud 46C, and the fourth shroud 46D. In the illustrated third housing 46, a first shield 46E operably engages with the first upright wall 46A1 of the third housing 46 and a plate 46E1 via attachment mechanism 46E2 (e.g., connectors and nuts maintain the first shield 46E with the first upright wall 46A1 and the plate 46E1). In the illustrated third housing 46, a second shield 46F operably engages with the third connecting wall 46A3, the second shroud 46B, and the third shroud 46C in which the second shield 46F is positioned between the second and third shrouds 46B, 46C. The second shield 46F is also maintained between the second and third shrouds 46B, 46C via attachment mechanism 46F1 (e.g., connectors and nuts maintain the second shield 46F with the second and third shrouds 46B, 46C) (see FIG. 5A). In the illustrated third housing 46, a third shield 46G operably engages with the third shroud 46C of the third housing 46 and a plate 46G1 via attachment mechanism 46G2 (e.g., connectors and nuts maintain the third shield 46G with the third shield 46G and the plate 46G1). Each of the first shield 46E, the second shield 46F, and the third shield 46G prevent cut debris and material from escaping the third housing 46 during or stump grinding operations, which is described in more detail below.

Figure 12:
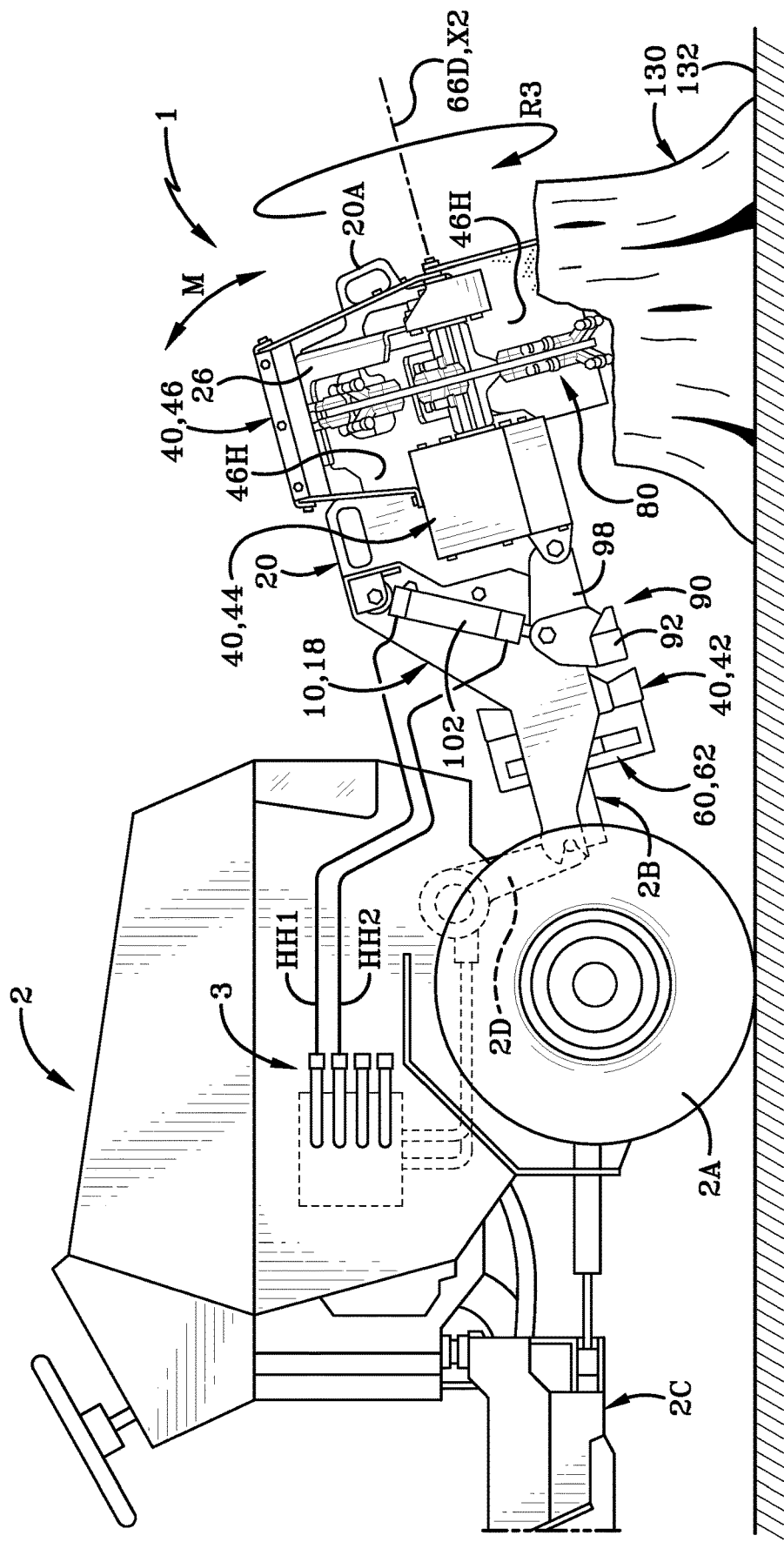
FIG. 12 is an operational view of the stump grinder being introduced to a stump and being initiated for cutting and grinding the stump.

Referring to FIGS. 1 and 12, the third housing 46 also defines a chamber 46H. In particular, the chamber 46H is collectively defined by the first shroud 46A, the second shroud 46B, the third shroud 46C, the fourth shroud 46D, the first shield 46E, the second shield 46F, and the third shield 46G. Such use and purpose of this chamber 46H is described in more detail below.

Referring to FIG. 3, the third housing 46 may also include securement mechanisms 461 that operably engage the first shroud 46A, the second shroud 46B, the third shroud 46C, the fourth shroud 46D with one another or other components and parts provided in the stump grinder 1. Each securement mechanism of the set of securement mechanisms 461 includes a connector that operably engages with a nut to collectively attach at least one shroud and at least another shroud with one another or with other components and parts provided in the stump grinder 1. As such, suitable features may be defined and/or provided in each first shroud 46A, the second shroud 46B, the third shroud 46C, the fourth shroud 46D (e.g., openings defined in the first shroud 46A, the second shroud 46B, the third shroud 46C, the fourth shroud 46D) to enable connectors of the set of securement mechanisms 461 to collectively attach at least one shroud and at least another shroud with one another or with other components and parts provided in the stump grinder 1. In other exemplary embodiments, any suitable mechanisms and/or components may be used to operably engage at least one shroud and at least another shroud with one another or with other components and parts provided in a stump grinder.

Referring to FIG. 10, the stump grinder 1 also includes a drive assembly that is generally referred to as 60. The drive assembly 60 operably engages with the power takeoff 2B of the vehicle 2 to deliver and transfer power from the tractor 2 to on-board drive components for cutting and/or grinding stumps.

The assemblies and components of the drive assembly 60 are described in more detail below. It should be understood that FIG. 10 illustrates a diagrammatic representation of specific assemblies and components of the stump grinder 1 in a single figure. Particularly, it should be understood that FIG. 10 illustrates a diagrammatic representation of the main body 40, the drive assembly 60, and other various parts and components of the stump grinder 1 in a single figure. Therefore, such diagrammatic representation of the main body 40, the drive assembly 60, and other various parts and components of the stump grinder 1 in FIG. 10 should not limit the configuration or functionality of any component or part illustrated in FIG. 10.

Now referring to FIG. 10, the drive assembly 60 includes a power takeoff assembly (hereinafter "PTO assembly") generally referred to as 62. The PTO assembly 62 includes a PTO pulley 62A that is housed inside of the chamber 42C defined by the first shroud 42A and the second shroud 42B of the first housing 42. The PTO pulley 62A is configured to freely rotate inside of the chamber 42C without interference from the first shroud 42A and the second shroud 42B. The PTO pulley 62A is also configured to operably engage with a PTO belt 62B of the PTO assembly 62 that operatively connects the power takeoff 2B of the tractor 2 and the PTO pulley 62A with one another. During operation, the PTO belt 62B transfers rotational energy generated from the power takeoff 2B by the tractor 2 to the stump grinder 1 via the PTO pulley 62A. Such rotational energy delivered to the PTO pulley 62A is then transferred to downstream assemblies and parts operably engaged with the PTO pulley 62A, which are described in more detail below.

Still referring to FIG. 10, the PTO assembly 62 also includes a PTO drive shaft 62C that operably engages with the PTO pulley 62A. The PTO drive shaft 62C includes a first end 62C1 that operably engages with the PTO pulley 62A, a second end 62C2 opposite to the first end 62C1, a circumferential wall 62C3 that extends between the first end 62C1 and the second end 62C2, and a longitudinal axis 62C4 extending between the first end 62C1 and the second end 62C2. In the illustrated embodiment, the longitudinal axis 62C4 of the PTO drive shaft 62C is parallel with the longitudinal axis of the tractor 2. Additionally, the longitudinal axis 62C4 of the PTO drive shaft 62C is also a first rotational axis X1 of the drive assembly 60 that rotates in a first direction orthogonal to the longitudinal driving direction of the tractor 2.

Still referring to FIG. 10, the PTO assembly 62 also includes a first pillow block bearing 62D that operably engages with the second shroud 42B of the first housing 42. The first pillow block bearing 62D is configured to operably engage with a portion of the circumferential wall 62C3 between the first end 62C1 and the second end 62C2 proximate to the first end 62C1. Still referring to FIG. 10, the PTO assembly 62 also includes a second pillow block bearing 62E that operably engages with the second shroud 44B of the second housing 44. The second pillow block bearing 62E is configured to operably engage with a portion of the circumferential wall 62C3 between the first end 62C1 and the second end 62C2 proximate to the second end 62C2. In the illustrated PTO assembly 62, the first pillow block bearing 62D and the second pillow block bearing 62E are coaxial with one another. During operation, the first and second pillow block bearings 62D, 62E provide rotational support to the PTO drive shaft 62C when the drive shaft 62C is rotated via the rotation of the PTO pulley 62A. In other exemplary embodiment, any suitable bearing assembly may be used to operably engage with a drive shaft of a PTO assembly to provide rotational support.

Still referring to FIG. 10, the drive assembly 60 also includes a belt drive assembly 64 operably engaged with the second housing 44 and operatively connected with the PTO assembly 62. Upon assembly, the belt drive assembly 64 is configured to receive rotational power from the PTO assembly 62 and to deliver and transfer rotational power to downstream drive components for cutting and/or grinding stumps described below. The components and parts of the belt drive assembly 64 will now be described.

Figure 9:
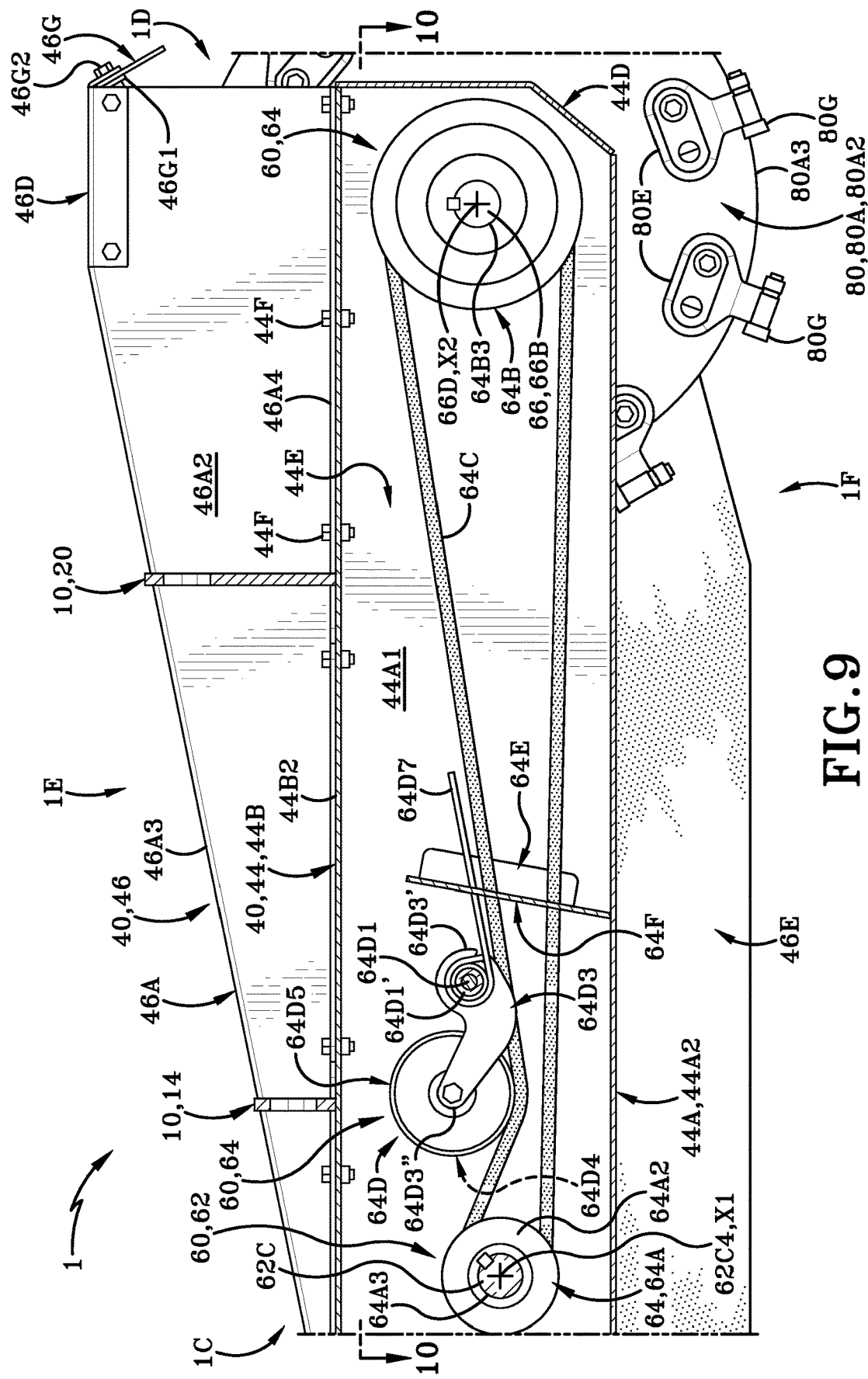
FIG. 9 is a partial sectional view of the stump grinder taken in the direction of line 9-9 as shown in FIG. 8.

Now referring to FIG. 10, the belt drive assembly 64 includes a first belt drive pulley 64A that operably engages with the second end 62C2 of the PTO drive shaft 62C. The first belt drive pulley 64A includes a first end 64A1, a second end 64A2 opposite to the first end 64A1, and a passageway 64A3 defined therebetween (see FIG. 9). The first belt drive pulley 64A also defines at least one groove 64A4 between the first end 64A1 and the second end 64A2. In the illustrated first belt drive pulley 64A, four grooves 64A4 are defined between the first end 64A1 and the second end 64A2. In other exemplary embodiments, any suitable number of grooves may be defined by a first belt drive pulley described and illustrated herein. Such use and purposes of the at least one groove 64A4 is also described in more detail below.

Still referring to FIG. 10, the belt drive assembly 64 also includes a second belt drive pulley 64B that is opposite to the first belt drive pulley 64A. The second belt drive pulley 64B includes a first end 64B1, a second end 64B2 opposite to the first end 64B1, and a passageway 64B3 defined therebetween (see FIG. 9). The second belt drive pulley 64B also defines at least one groove 64B4 between the first end 64B1 and the second end 64B2; the at least one groove 64B4 is also aligned with the at least one groove 64A4 of the first belt drive pulley 64A. In the illustrated second belt drive pulley 64B, four grooves 64B4 are defined between the first end 64B1 and the second end 64B2 and are aligned with the four grooves 64A4 of the first belt drive pulley 64A. In other exemplary embodiments, any suitable number of grooves may be defined by a second belt drive pulley described and illustrated herein. Such use and purposes of the at least one groove 64B4 is also described in more detail below.

Still referring to FIG. 10, the belt drive assembly 64 also includes at least one belt 64C that operably engages with the first belt drive pulley 64A and the second belt drive pulley 64B. In the illustrated embodiment, the at least one belt 64C is configured to operably engage with the first belt drive pulley 64A via the at least one groove 64A4. Similarly, the at least one belt 64C is also configured to operably engage with the second belt drive pulley 64B via the at least one groove 64B4. Upon this engagement, the at least one belt 64C is configured to transfer rotational force from the first belt drive pulley 64A to the second belt drive pulley 64B to deliver rotational force to downstream drive components for cutting and/or grinding stumps, which are described in more detail below. In the illustrated belt drive assembly 64, four belts 64C are operably engaged with the four grooves 64A4 of the first belt drive pulley 64A and the four grooves 64B4 of the second belt drive pulley 64B. In other exemplary embodiments, any suitable number of belts may be used depending on the number grooves be defined by a first belt drive pulley and a second belt drive pulley described and illustrated herein.

Still referring to FIG. 10, the belt drive assembly 64 also includes a belt tensioner assembly 64D operably engaged with the second housing 44 and operatively engaged with the at least one belt 64C. As described in more detail below, the belt tensioner assembly 64D is configured to provide suitable tension on the at least one belt 64C to maintain the at least one belt 64C with the first belt drive pulley 64A and the second belt drive pulley 64B during stump grinding operations. Such components and parts of the belt tensioner assembly 64D are also described in more detail below.

Still referring to FIG. 10, the belt tensioner assembly 64D includes a support member 64D1 that operably engages with the second housing 44, particularly the first shroud 44A and the second shroud 44B. In the illustrated embodiment, the support member 64D1 is attached to the first shroud 44A and the second shroud 44B via connectors at each end of the support member 64D1. In other exemplary embodiments, any suitable mechanisms and/or methods may be used to attached a support member with a first shroud and a second shroud of a second housing. The support member 64D1 also includes at least one sleeve 64D1' that operably engages with the first shroud 44A, the second shroud 44B, and an outer circumferential wall (not illustrated) of the support member 64D1. In the illustrated embodiment, the belt tensioner assembly 64D includes two sleeves 64D1' that operably engages with the support member 64D1 and separated by at least one spacer 64D1". In this illustrated embodiment, the first sleeve 64D1' operably engages with a portion of the support member 64D1 and extends between the first shroud 44A and the at least one spacer, and the second sleeve 64D1' operably engages with a portion of the support member 64D1 and extends between the second shroud 44B and the at least one spacer. Each of the sleeves 64D1' also rotate separate and independently of one another during operation.

Still referring to FIG. 10, the belt tensioner assembly 64D also includes at least one arm that operably engages with the support member 64D1. In the illustrated embodiment, the belt tensioner assembly 64D includes a first arm 64D2 that operably engages with the first sleeve 64D1' proximate to the first shroud 44A. The first arm 64D2 includes a first end 64D2' that operably engages with the first sleeve 64D1' and a second end 64D2" opposite to the first end 64D2' and remote from the first sleeve 64D1'. During operation, the first arm 64D2 is freely rotatable about the first sleeve 64D1' for tensioning reasons, which is described in more detail below.

Similarly, in the illustrated embodiment, the belt tensioner assembly 64D also includes a second arm 64D3 that operably engages with the support member 64D1. In the illustrated embodiment, second arm 64D3 operably engages with the second sleeve 64D1' proximate to the second shroud 44B. The second arm 64D3 includes a first end 64D3' that operably engages with the second sleeve 64D1' and a second end 64D2" opposite to the first end 64D2' and remote from the second sleeve 64D1'. During operation, the second arm 64D3 is freely rotatable about the second sleeve 64D1' for tensioning reasons, which is described in more detail below.

Still referring to FIG. 10, the belt tensioner assembly 64D also includes at least one engagement member that operably engages with the at least one arm. During operation, the at least one engagement member is freely rotatable on the at least one arm when the at least one belt 64C is rotating. In the illustrated embodiment, a first engagement member 64D4 operably engages with the first arm 64D2 at the second end 64D2" of the first arm 64D2. During operation, the first engagement member 64D4 operably engages with two belts 64C of the belt drive assembly 64 to maintain tension on these two belts 64C to be retained with the first belt drive pulley 64A and the second belt drive pulley 64B. Similarly, in the illustrated embodiment, a second engagement member 64D5 operably engages with the second arm 64D3 at the second end 64D3" of the second arm 64D3. During operation, the second engagement member 64D5 operably engages with two other belts 64C of the belt drive assembly 64 to maintain tension on these two other belts 64C to be retained with the first belt drive pulley 64A and the second belt drive pulley 64B.

Still referring to FIG. 10, the belt tensioner assembly 64D also includes at least one biaser that operably engages with support member 64D1 and the at least one arm. During operation, the at least one biaser applies tensile force on the at least one arm to maintain a desired tension on the at least one belt. In the illustrated embodiment, a first biaser 64D6 operably engages with the support member 64D1 proximate to the first end 64D1' and operably engages with the first end 64D2' of the first arm 64D2. During operation, the first biaser 64D6 applies tensile force on the first arm 64D2 to maintain a desired tension on two belts 64C via the first engagement member 64D4. Similarly, in the illustrated embodiment, a second biaser 64D7 operably engages with the support member 64D1 proximate to the second end 64D1" and operably engages with the first end 64D3' of the second arm 64D3. During operation, the second biaser 64D7 applies tensile force on the second arm 64D3 to maintain a desired tension on two other belts 64C via the second engagement member 64D5. In the illustrated embodiment, the first and second biasers 64D6, 64D7 are torsion springs. In other exemplary embodiments, any suitable spring and/or component that provides biasing means may be used to applies tensile force on the at least one arm to maintain a desired tension on the at least one belt.

Still referring to FIG. 10, the belt drive assembly 64 includes at least one upright support operably engaged with the second housing 44. The at least one upright support is configured to retain a portion of at least one biaser of the belt tensioner assembly 64D to enable the at least one biaser to apply tension to the at least one arm of the belt tensioner assembly 64D. In the illustrated embodiment, the belt drive assembly 64 includes a first upright support 64E that operably engages with the first shroud 44A of the second housing 44. The first upright support 64E also defines a set of notches 64E1 that extend into the first upright support 64E (see FIG. 8). Each notch of the set of notches 64E1 is configured to support a portion of the first biaser 64D6 to enable the first biaser 64D6 to apply tension to the first arm 64D2 of the belt tensioner assembly 64D. Similarly, in the illustrated embodiment, the belt drive assembly 64 includes a second upright support 64F that operably engages with the second shroud 44B of the second housing 44. The second upright support 64F also defines a set of notches 64F1 that extend into the second upright support 64F. Each notch of the set of notches 64F1 is configured to support a portion of the second biaser 64D7 to enable the second biaser 64D7 to apply tension to the second arm 64D3 of the belt tensioner assembly 64D.

Still referring to FIG. 10, the drive assembly 60 also includes a grinder drive shaft 66 that operably engages with the second belt drive pulley 64B. The grinder drive shaft 66 includes a first end 66A that operably engages with the second belt drive pulley 64B, a second end 66B opposite to the first end 66A, a circumferential wall 66C that extends between the first end 66A and the second end 66B, and a longitudinal axis 66D defined between the first end 66A and the second end 66B. In the illustrated embodiment, the longitudinal axis 66D of the grinder drive shaft 66 is parallel with the longitudinal axis of the tractor 2. Additionally, the longitudinal axis 66D of the grinder drive shaft 66 is also a second rotational axis X2 of the drive assembly 60 rotates in a second direction orthogonal to the longitudinal driving direction of the tractor 2.

Still referring to FIG. 10, the drive assembly 60 also includes a first pillow block bearing 68 that operably engages with the first shroud 44A of the second housing 44. The first pillow block bearing 68 is configured to operably engage with a portion of the circumferential wall 66C between the first end 66A and the second end 66B proximate to the first end 66A. Still referring to FIG. 10, the drive assembly 60 also includes a second pillow block bearing 70 that operably engages with the third cross member 28 of the chassis 10. The second pillow block bearing 70 is configured to operably engage with a portion of the circumferential wall 66C between the first end 66A and the second end 66B proximate to the second end 66B. In the illustrated drive assembly 60, the first pillow block bearing 68 and the second pillow block bearing 70 are coaxial with one another. During operation, the first and second pillow block bearings 68, 70 provide rotational support to the grinder drive shaft 66. In other exemplary embodiment, any suitable bearing assembly may be used to operably engage with a grinder drive shaft to provide rotational support.

Referring to FIGS. 3 and 10, the stump grinder 1 also includes a grinder wheel 80 operatively engaged with the drive assembly 60. In particular, the grinder wheel 80 operatively engages with the grinder drive shaft 66 of the drive assembly 60. Upon this engagement, the drive assembly 60 is enabled to deliver and transfer rotational force generate from the tractor 2 to the grinder wheel 80 for cutting and grinding down stumps. The components and parts of the grinder wheel 80 are described in more detail below.

Referring to FIGS. 3 and 10, the grinder wheel 80 includes a plate 80A that operably engages with the grinder drive shaft 66 of the drive assembly 60. The plate 80A includes a first surface 80A1 facing in the direction towards the front end 1A, a second surface 80A2 facing away from the first surface 80A1 in the direction towards the rear end 1B, and an outer circumferential edge 80A3 defined between the first and second surfaces 80A1, 80A2. The plate 80A also defines a central opening 80A4 extending entirely through the plate 80A between the first and second surface 80A1, 80A2. The central opening 80A4 is configured to receive a portion of the circumferential wall 66C of the grinder drive shaft 66 to enable the grinder drive shaft 66 and the plate 80A to operably engaged with one another.

Referring to FIGS. 3 and 10, the grinder wheel 80 also includes at least one rib that operably engages with one of the first surface 80A1 and the second surface 80A2 of the plate 80A. The at least one rib extends outwardly from the plate 80A and is configured to receive a portion of the grinder drive shaft 66. In the illustrated grinder wheel 80, a plurality of ribs 80B operably engages with the first surface 80A1 and the second surface 80A2 and extends outwardly from the first surface 80A1 and the second surface 80A2. The plurality of ribs 80B is also configured to receive a portion of the grinder drive shaft 66 measured between the first end 66A and the second end 66B. During operation, the plurality of ribs 80B provides axial support to the grinder drive shaft 66 when the grinder drive shaft 66 and the grinder wheel 80 are rotating and/or spinning.

Referring to FIG. 10, the grinder wheel 80 also includes at least one abutment ring 80C that operably engages with a portion of the grinder drive shaft 66. In the illustrated embodiment, a first abutment ring 80C operably engages with the plurality of ribs 80B and the grinder drive shaft 66 to prevent the plurality of ribs 80B from contacting the first shroud 44A when the plurality of ribs 80B is rotating during operation. In the illustrated embodiment, a second abutment ring 80C opposite to the first abutment ring 80C operably engages with the plurality of ribs 80B and the grinder drive shaft 66 to prevent the plurality of ribs 80B from contacting the second shroud 44B when the plurality of ribs 80B is rotating during operation Referring to FIGS. 3 and 10, the grinder wheel 80 also includes at least one set of mounting blocks that operably engages with the plate 80A. As illustrated, the grinder wheel 80 includes a set of first mounting blocks 80D that operably engages with the first surface 80A1 of the plate 80A. Each mounting block of the set of first mounting blocks 80D extends outwardly form the first surface 80A1 and away from the plate 80A towards the front end 1A. Similarly, the grinder wheel 80 also includes a set of second mounting blocks 80E that operably engages with the second surface 80A2 of the plate 80A. Each mounting block of the set of second mounting blocks 80E extends outwardly form the second surface 80A2 and away from the plate 80A towards the rear end 1B. Such uses and purposes of the set of first mounting blocks 80D and the set of second mounting blocks 80E are described in more detail below.

Still referring to FIGS. 3 and 10, the grinder wheel 80 also includes at least one set of teeth that operably engages with the at least one set of mounting blocks. As illustrated, the grinder wheel 80 includes a set of first teeth 80F that operably engages with the set of first mounting blocks 80D. Each tooth of the set of first teeth 80F are replaceable in that each tooth of the set of first teeth 80F are removable from a respective mounting block of the set of first mounting blocks 80D when the tooth is dull or damaged causing hindrance to the grinder wheel 80 during stump grinding operations. Similarly, the grinder wheel 80 also includes a set of second teeth 80G that operably engages with the set of second mounting blocks 80E. Each tooth of the set of second teeth 80G are also replaceable in that each tooth of the set of second teeth 80G are removable from a respective mounting block of the set of second mounting blocks 80E when the tooth is dull or damaged causing hindrance to the grinder wheel 80 during stump grinding operations.

Referring to FIGS. 2 and 10, a visible portion 80H of the grinder wheel 80 protrudes outside of the main body 40 of the stump grinder 1. Specifically, the visible portion 80H of the grinder wheel 80 is measured from teeth of the sets of the first and second teeth 80F, 80G to the first shroud 46A or to the fourth shroud 44D of the second housing 44. With this visible portion 80H, an operator has a line-of-sight for visualizing the position of the grinder wheel 80 relative to the stump when operating the stump grinder 1 and the tractor 2 from the operator seat 2E. Such line-of-sight of the operator visualizing the visible portion 80H from the operator seat 2E is denoted by dotted lines labeled "LOS" in FIG. 2. The visible portion 80H of the grinder wheel 80 is considered advantageous at least because the operator of the stump grinder 1 is enabled to precisely position the grinder wheel 80 on a stump for precisely cutting and/or grinding the stump to a suitable depth in which the stump is below the ground surface. Moreover, the stump grinder 1 omits any tools in assisting or aiding the operator in positioning the grinder wheel 80 relative to the stump during stump grinding operations due to this visible portion 80H of the grinder wheel 80.

Figure 11:
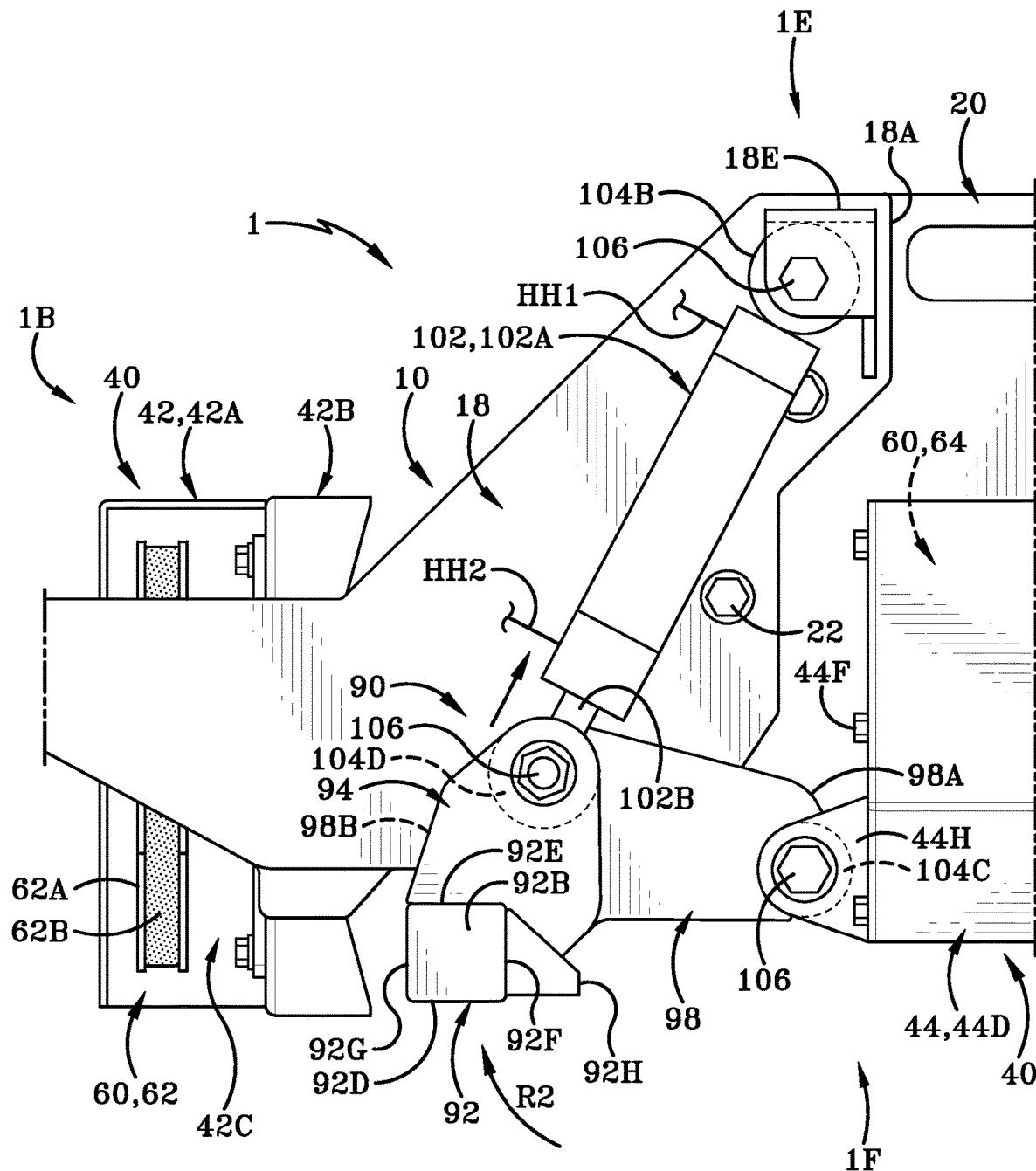
FIG. 11 is a partial first side elevation view of the stump grinder, wherein the push blade assembly is provided in the stored position.
Figure 13:
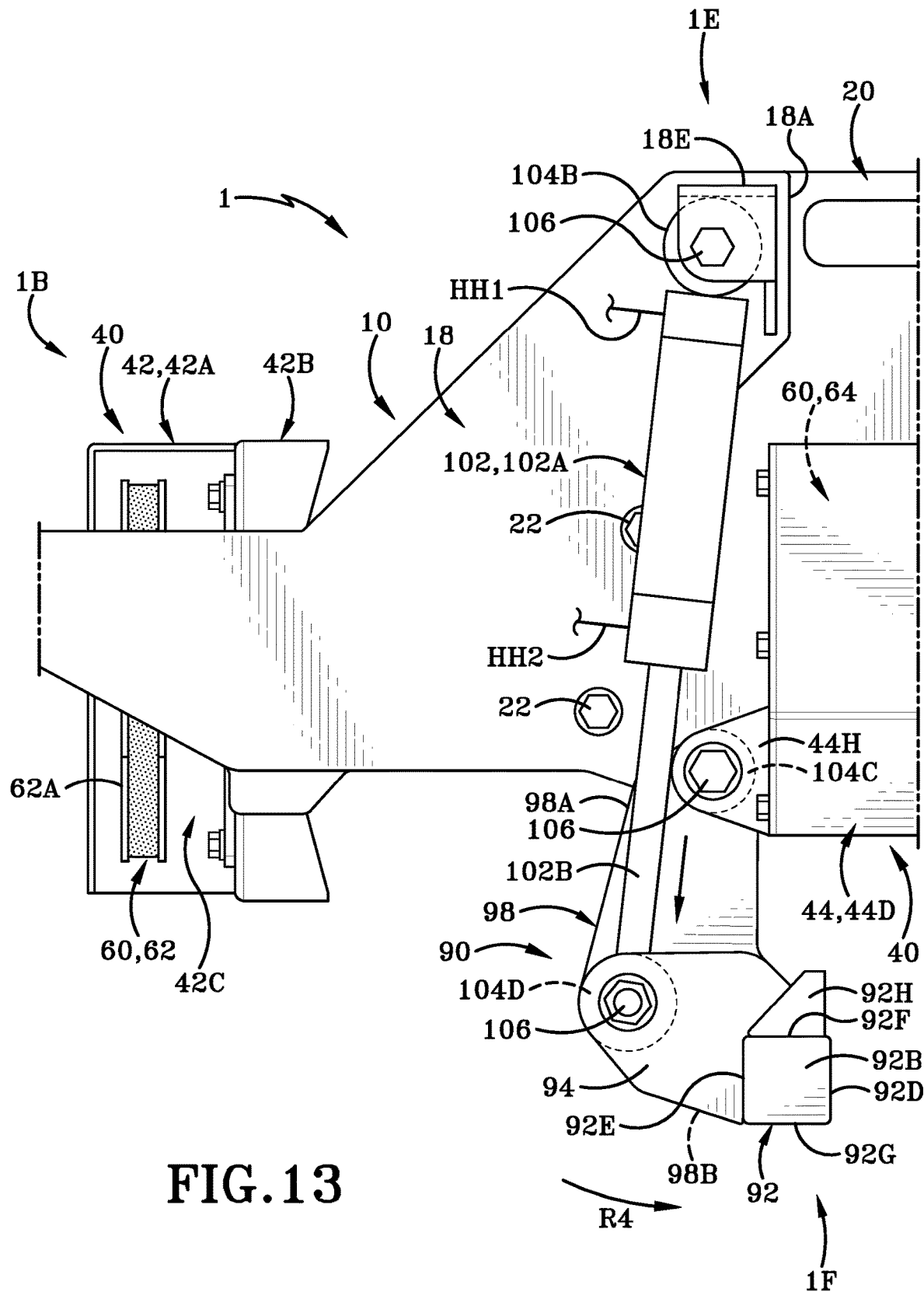
FIG. 13 is another operational view of the stump grinder, but the push blade assembly is being actuated from the stored position to the operating position.

Referring to FIGS. 11 and 13, the stump grinder 1 also includes a push blade assembly 90 that operably engages with one or both of the chassis 10 and the main body 40. The push blade assembly 90 is configured to be moveable and/or rotatable between a stored position (see FIG. 11) and an operating position (see FIG. 13) during stump grinding operations and storing operations; such stored and operating positions of the push blade assembly 90 are described in more detail below. Moreover, the push blade assembly 90 also rotates forwardly and rearwardly along the longitudinal axis or a longitudinal plane of the stump grinder 1 when being provided in the stored position and the operating position. The components and parts of the push blade assembly 90 are described in more detail below.

Referring to FIG. 3, the push blade assembly 90 includes a push blade 92. The push blade 92 includes a first end 92A (see FIGS. 5A-5B), a second end 92B opposite to the first end 92A, and a longitudinal axis 92C defined therebetween. The push blade 92 also includes a front wall 92D, a rear wall 92E opposite to the front wall 92D, a top wall 92F, and a bottom wall 92G opposite to the top wall 92F in which the front wall 92D, the rear wall 92E, the top wall 92F, and the bottom wall 92G collectively define a square cross-section for the push blade 92. The push blade 92 also includes an extension 92H that extends outwardly and upwardly from the top wall 92F towards the top end 1E; such use and purpose of the extension 92H is described in more detail below.

Referring to FIG. 3, the push blade assembly 90 also includes a mounting bracket 94 that operably engages with the front wall 92D and the top wall 92F of the push blade 92 proximate to the first end 92A; such use and purpose of the mounting bracket 94 is described in more detail below.

Still referring to FIG. 3, the push blade assembly 90 also includes at least on pivot arm that operably engages the push blade 92 with one of the chassis 10 and the main body 40. In the illustrated stump grinder 1, the push blade assembly 90 includes a first pivot arm 96 that operably engages the push blade 92 with the first mounting bracket 44G. The first pivot arm 96 includes a first end 96A that operably engages with the first mounting bracket 44G and a second end 96B opposite to the first end 96A and that operably engages with the push blade 92. In the illustrated stump grinder 1, the push blade assembly 90 also includes a second pivot arm 98 that operably engages the push blade 92 with the second mounting bracket 44H and the mounting bracket 94 (see FIG. 6). As illustrated in FIG. 6, the second pivot arm 98 includes a first end 98A that operably engages with the second mounting bracket 44H and a second end 98B opposite to the first end 98A and that operably engages with the push blade 92.

Referring to FIGS. 3 and 6, the push blade assembly 90 also includes a cross member 100 that extends between the first pivot arm 96 and the second pivot arm 98 parallel with the longitudinal axis 92C of the push blade 92. The cross member 100 provides lateral support and strength between the first pivot arm 96 and the second pivot arm 98 during stump grinding operations and storing operations. As illustrated in FIG. 6, the cross member 100 also defines a notch 100A that extends upwardly into the cross member 100. The notch 100A is sized and configured to enable the cross member 100 to receive a portion of the second control arm 18 when the push blade assembly 90 is provided in the stored position. The notch 100A enables the push blade 92 to be fully removed from a ground surface in which the push blade 92 is positioned above the set of firth teeth 80F and the set of second teeth 80G during stump grinding operations.

Still referring to FIGS. 3 and 6, the push blade assembly 90 also includes an actuator 102 that operably engages with the chassis 10 and the push blade 92 to rotate the push blade 92 between the stored position and the operating position. In the illustrated push blade assembly 90, the actuator 102 includes a cylinder 102A that operably engages with the chassis 10 via the mounting bracket 18E of the second control arm 18. The actuator 102 also includes a piston rod 102B operatively engaged with the cylinder 102A and operably engages with the push blade 92. The actuator 102 also includes hydraulic receptacles 102C that enable hydraulic lines of the tractor 2 to provide hydraulic pressure to the actuator 102 to rotate the push blade 92 between the stored position and the operating position, which is described in more detail below.

Still referring to FIGS. 3 and 6, the push blade assembly 90 also includes a set of pivot members 104 that operably engage with various components of the stump grinder 1 to provide sufficient sliding and reduction in friction when rotation the push blade 92 between the stored and operating positions. In the illustrated embodiment, the set of pivot members 104 includes a first pivot member 104A that operably engages with first mounting bracket 44G and the first end 96A of the first pivot arm 96 (see FIG. 6). The set of pivot members 104 also includes a second pivot member 104B that operably engages with the mounting bracket 18E and the cylinder 102A. The set of pivot members 104 also includes a third pivot member 104C that operably engages with the second mounting bracket 44H and the first end 98A of the second pivot arm 98. The set of pivot members 104 also includes a fourth pivot member 104D that operably engages with the mounting bracket 94, the second end 98B of the second pivot arm 98, and the piston rod 102B.

Still referring to FIGS. 3 and 6, a set of attachment mechanism 106 (i.e., connectors threadably engaging with nuts) operably engages the components of the push blade assembly 90 with respective components of the chassis 10 and the main body 40. As illustrated, a first attachment mechanism of the set of attachment mechanism 106 operably engages first pivot arm 96 with the first mounting bracket 44G and the first control arm 12. A second attachment mechanism of the set of attachment mechanism 106 operably engages the cylinder 102A and the second pivot member 104B with the mounting bracket 18E and the second control arm 18. A third attachment mechanism of the set of attachment mechanism 106 operably engages the second pivot arm 98 and the third pivot member 104C with the second mounting bracket 44H. A fourth attachment mechanism of the set of attachment mechanism 106 operably engages the piston rod 102B and the fourth pivot member 104D with the mounting bracket 94 and the second pivot arm 98.

As illustrated, the push blade assembly 90 may be used for various reasons when performing stump grinding operations or when storing the stump grinder 1. During stump grinding operations, the push blade 92 may be used to remove and/or clean the area surrounding the stump subsequent cutting and/or grinding the stump into the ground surface. The push blade 92 may also be used to level and grade the area surrounding the stump by dragging or pushing soil into a hole created by the grinder wheel 80 when cutting and grinding the stump into the ground surface. The push blade 92 may also be used periodically during stump grinding operations to determine the height of the stump relative to the ground surface; in other words, the push blade 92 may be used as a depth indicator to determine if the stump is below the ground surface. As for storing operations, the push blade 92 of the push blade assembly 90 may be used as a vertical support to maintain the stump grinder 1 at a leveled position when not supported by the tractor 2; additional assemblies and components of the stump grinder 1 may assist the push blade assembly 90 during these storing operations.

Referring to FIGS. 5A-5B, the stump grinder 1 also includes a kickstand assembly 120 that operably engages with the main body 40, particularly with the second housing 44. The kickstand assembly 120 is configured to provide support to the stump grinder 1 when the stump grinder 1 is disconnected from the tractor 2 and the kickstand assembly 120 is provided in a support position (see FIG. 5A). As such, the push blade assembly 90 and the kickstand assembly 120 collectively provide support to the stump grinder 1 in which the push blade assembly 90 provides support along the transverse axis of the stump grinder 1 and the kickstand assembly 120 provides support along the longitudinal axis of the stump grinder 1. The kickstand assembly 120 may also be provided in an unsupported position (see FIG. 5B) when the stump grinder 1 is connected with the tractor 2 for stump grinding operations. Such components of the kickstand assembly 120 are described in more detail below.

Still referring to FIG. 5A-5B, the kickstand assembly 120 includes a kickstand 122 that operably engages with the second housing 44, particularly the third shroud 44C. As illustrated, the kickstand 122 includes a first end 122A, a second end 122B opposite to the first end 122A and remote from the third shroud 44C, a first portion 122C extending from the first end 122A towards the second end 122B, second portion 122D extending from the first portion 122C towards the second end 122B, and a third portion 122E extending from the second portion 122D to the second end 122B. As illustrated, the first portion 122C operably engages with the third shroud 44C at least one location on the third shroud 44C, which is described in more detail below. The kickstand 122 also includes a ground contacting portion 122E1 that extends laterally away from the third portion 122E along an axis that is parallel with the transverse axis "Y" of the stump grinder 1. The ground contacting portion 122E1 is configured to engage and contact the ground surface when the kickstand 122 is lowered towards the ground for stabilizing the stump grinder 1 when the stump grinder 1 is detached from the tractor 2.

The kickstand 122 also defines a first aperture 122F that extends entirely through the first portion 122C and is proximate to the first end 122A. The kickstand 122 also defines a second aperture 122G that extends entirely through the first portion and is proximate to the second end 122B near the second portion 122D. Such uses and purposes of the first aperture 122F and the second aperture 122G are described in more detail below.

Still referring to FIGS. 5A-5B, the kickstand assembly 120 also includes a pivot mechanism 124 that operably engages with the kickstand 122. Specifically, the pivot mechanism 124 operably engages the first portion 122C of the kickstand 122 with the third shroud 44C via the first aperture 44C1 and the second aperture 122G. The pivot mechanism 124 is a connector threadably engaged with a nut to operably engage the kickstand 122 with the third shroud 44C. The connector of the pivot mechanism 124 also defines a rotational axis in which the kickstand 122 rotates about when rotated between the support and unsupported positions. Such rotation of the kickstand 122 via the pivot mechanism 124 is denoted by an arrow labeled "R1" in FIG. 5B.

Still referring to FIGS. 5A-5B, the kickstand assembly 120 also includes a removable pin 126 that operably engages the kickstand 122 with the third shroud 44C at the second aperture 44C2 or the third aperture 44C3. Specifically, the pin 126 operably engages with the first portion 122C of the kickstand 122, via the first aperture 122F, and one of the second aperture 44C2 or the third aperture 44C3 of the third shroud 44C to maintain the kickstand 122 at either the support position or the unsupported position. As illustrated in FIG. 5A, the pin 126 operably engages with the first portion 122C of the kickstand, via the first aperture 122F, and the second aperture 44C2 of the third shroud 44C to maintain the kickstand 122 at the support position; an operator may desire this configuration when the stump grinder 1 is disconnected from the tractor 2 and the stump grinder 1 is collectively supported by the push blade assembly 90 and the kickstand assembly 120. As illustrated in FIG. 5B, the pin 126 operably engages with the first portion 122C of the kickstand, via the first aperture 122F, and the third aperture 44C3 of the third shroud 44C to maintain the kickstand 122 at the unsupported position; an operator may desire this configuration when the stump grinder 1 is connected with the tractor 2.

Having now described the assemblies and components of the stump grinder 1, a method of using the stump grinder 1 for stump grinding is described in more detail below.

Prior to an operator performing a stump grinding operation, the operator may operably engage the stump grinder 1 with the tractor 2 by operably engaging the attachment hitch arms 2D of the tractor 2 with the first control arm 12 and the second control arm 18 (see FIG. 1). Once the stump grinder 1 is connected to the tractor 2, the operator may then operably engage a plurality of hydraulic hoses "HH" of the stump grinder 1 to the mechanical power assembly 3 of the tractor 2. The hydraulic hoses "HH" that operably connect to the mechanical power assembly 3 of the tractor 2 provide power and control over the actuator 102 of the push blade assembly 90 for articulating and/or rotating the push blade 92 forwardly and rearwardly along the longitudinal axis of the stump grinder 1. As illustrated in FIG. 1, a first hydraulic hose "HH1" and a second hydraulic hose "HH2" of the plurality of hydraulic hoses "HH" may be operably engaged with the mechanical power assembly 3 of the tractor 2 for operably controlling the actuator 102 via the hydraulic receptacles 102C. The operator may then operably engage the PTO 2B of the tractor 2 with the stump grinder 1, via the PTO belt 62B, for operably powering the drive assembly 60 of the stump grinder 1.

Once the stump grinder 1 is operably engaged with the tractor 2 (see FIG. 1), the operator may adjust and/or arrange associated assemblies and parts of the stump grinder 1 in particular configurations and/or orientations prior to performing a stump grinding operation with said stump grinder 1. Such assemblies and parts that may be adjusted and/or arranged prior to or while performing a stump grinder operation are provided in more detail below.

Referring to FIG. 12, the operator (labeled as "OP" in FIG. 2) may introduce the stump grinder 1 to a stump 130 for cutting and/or grinding the stump 130 towards a ground surface 132. Before stump grinding occurs, the operator may apply a first input on the first control lever 5 to initially lift the stump grinder 1 vertically above the stump 130, via the attachment hitch arms 2D, so that the grinder wheel 80 may be directly over the stump 130. The operator may also apply a first input on the first control lever 5 to rotate the push blade 92 rearwardly towards the first and second control arms 12, 18, via the actuator 102, so that the push blade 92 does interfere with the cutting operations being performed by the stump grinder 1. Such rearward rotation of the push blade 92 is denote by an arrow labeled "R2" in FIG. 11.

As the stump grinder 1 is lifted to a suitable height above the stump 130, the operator may precisely view the grinder wheel 80 relative to the stump 130 via the visible portion 80H (see FIG. 2). Such precise viewing of the grinder wheel 80 is considered advantageous at least because the operator may align the grinder wheel 80 exactly on the stump 130 to accurately grind and/or cut the stump 130 to a suitable depth. Once the grinder wheel 80 is aligned with the stump 130, the operator may then initiate rotational power to the stump grinder 1 by onboard power generated by the tractor 2 through the power takeoff 2B.

As described above, the rotational power generated by the power takeoff 2B of the tractor 2 is initially transferred to the PTO assembly 62 of the drive assembly 60. Specifically, the PTO pulley 62A rotates in a first direction about the first rotational axis X1 via the PTO belt 62B connecting the power takeoff 2B of the tractor 2 with the PTO pulley 62A. The rotation of the PTO pulley 62A also rotates the PTO drive shaft 62C in the same direction about the first rotational axis X1 defined by the PTO drive shaft 62C. The first and second pillow block bearings 62D, 62E provide axial support to the PTO drive shaft 62C during rotation. In the illustrated embodiment, the first rotational axis and/or first driving axis X1 is parallel with the longitudinal axis of the tractor 2.

Once the PTO drive shaft 62C rotates, the PTO drive shaft 62C then transfers this rotational power to the first belt drive pulley 64A. Specifically, the first belt drive pulley 64A rotates in the first rotational axis X1 via the connection between the PTO drive shaft 62C and the first belt drive pulley 64A. The rotation of the first belt drive pulley 64A then causes the at least one belt 64C to rotate about the first belt drive pulley 64A and the second belt drive pulley 64B. The at least one belt 64C is also maintained at a desired tension with the first and second belt drive pulleys 64A, 64B via the belt tensioner assembly 64D.

Once the second belt drive pulley 64B rotates, the second belt drive pulley 64B then transfers this rotational power to the grinder drive shaft 66. Specifically, the grinder drive shaft 66 rotates in the second rotational axis X2 via the connection between the second belt drive pulley 64B and the grinder drive shaft 66. The rotation of the grinder drive shaft 66 then causes the grinder wheel 80 to rotate about the second rotational axis X2. The rotation of the grinder drive shaft 66 and the grinder wheel 80 is denoted by an arrow labeled "R3" in FIG. 12. In the illustrated embodiment, the first rotational axis X1 and the second rotational axis X2 are parallel with one another and parallel with the longitudinal axis of the tractor 2.

Once the grinder wheel 80 is at a suitable rotational speed, the operator may then apply a second input on the first control lever 5 to lower the grinder wheel 80 towards the stump 130 until the grinder wheel 80 begins to cut and grind into the stump 130. Such movement of the stump grinder 1 into the stump 130 is denoted by a double arrow labeled "M" in FIG. 12. During this grinding operation, the operator may also elevate and/or raise the stump grinder 1 away from the stump 130 when the operator desires to cut and grind another portion of the stump 130 (see FIG. 12). During this grinding operation, the operator may also periodically lower the stump grinder 1 towards the ground surface 132 as the stump 130 begins to lose height via the cutting and grinding performed by the grinder wheel 80.

Figure 14:
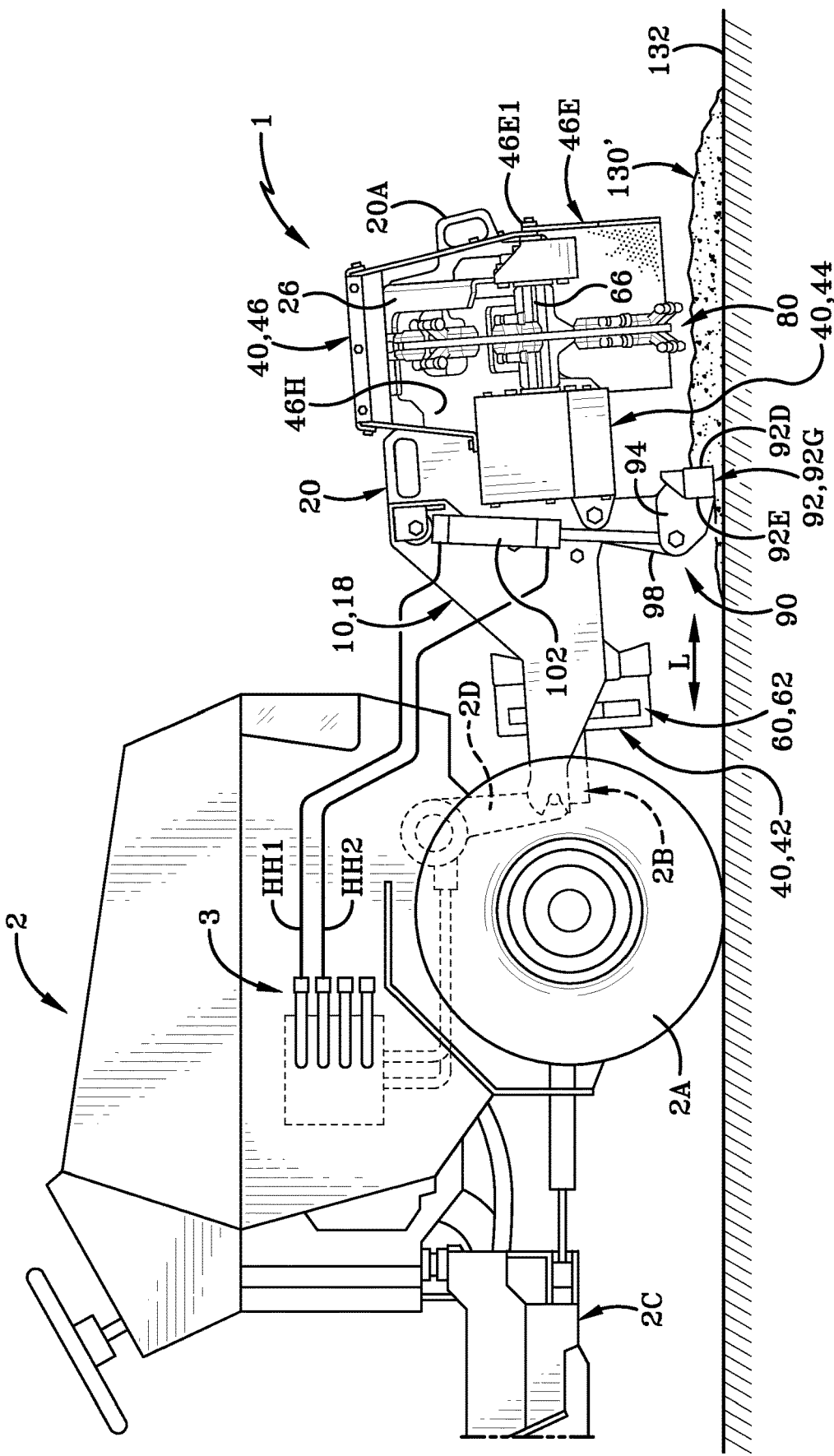
FIG. 14 is another operational view of the stump grinder, but a push blade of the push blade assembly is used to grade the ground surface and to inspect a height of the stump subsequent to cutting and grinding operations.

During the stump grinding operation, the operator may then apply a second input on the first control lever 5 to actuate the push blade 92 from the stored position to the operating position. As illustrated in FIG. 13, the second input on the first control lever 5 forwardly moves the push blade 92 towards the grinder wheel 80 via the actuator 102. Such forward rotation of the push blade 92 is denoted by an arrow labeled "R4" in FIG. 13. Once the push blade 92 reaches the operating position, the operator may use the push blade 92 as a depth measurement device to determine the height of the stump 130 relative to the ground surface 132. If the push blade 92 crashes into the stump 130, the operator may desire to reinitiate cutting and grinding operations until the stump 130 is below the ground surface 132. If the push blade 92 glides over the stump 130, the operator may desire to cease cutting and grinding operations since the stump 130 is below the ground surface 132. The operator may also use the push blade 92 to push stump debris and soil, via the top wall 92F and the extension 92H, or drag stump debris and soil, via the bottom wall 92G and the extension 92H, from the surrounding area for leveling and grading of the ground surface 132. Such use of the push blade 92 as a depth measurement device and/or a leveler is denoted by a double arrow labeled "L" in FIG. 14.

Once the stump grinding operation has ceased, the operator may disconnect the stump grinder 1 from the tractor 2. Prior to disconnection, the operator may rotate the push blade 92 forwardly to the operating position (if not already in the operating position) and rotate the kickstand 122 from the unsupported position to the supported position (see FIG. 5A). Once the push blade 92 and the kickstand 122 are provided in the operating and supported positions, the stump grinder 1 may then be disconnected from the tractor 2 and may be self-supported due to the push blade 92 and the kickstand 122.

Figure 15:
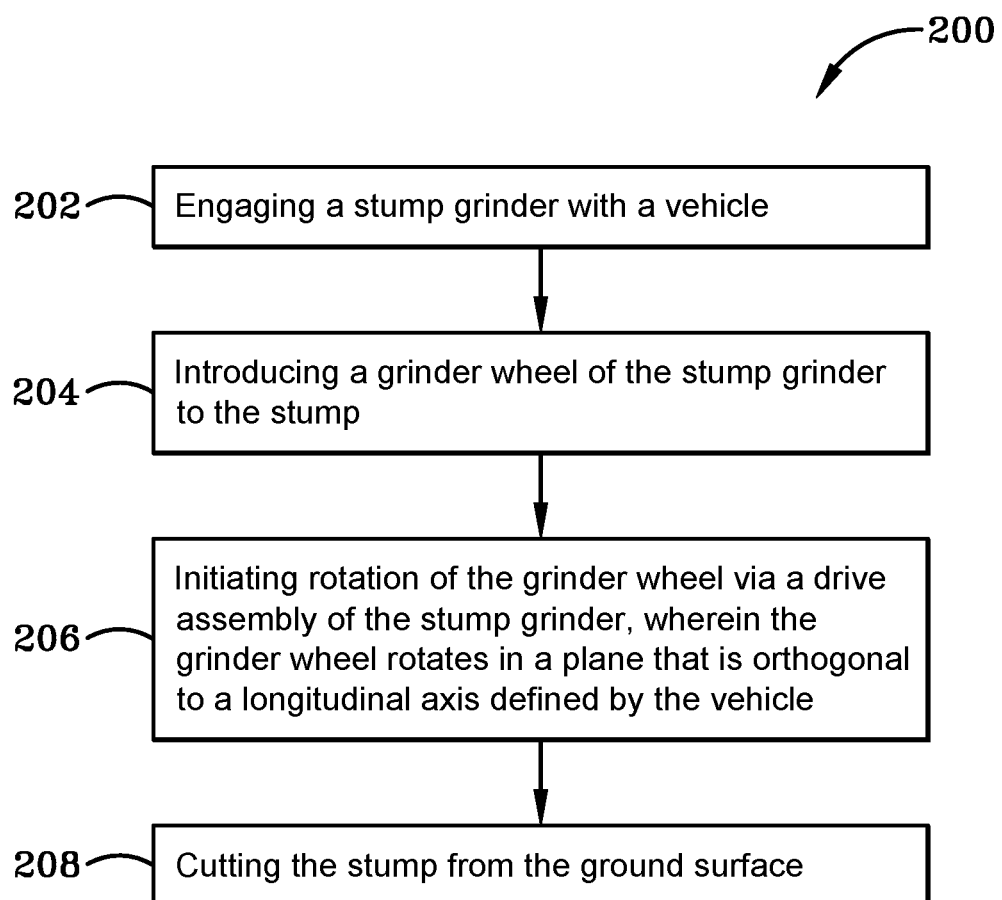
FIG. 15 is an exemplary method flowchart.

FIG. 15 illustrates a method 200 of cutting a stump from a ground surface. An initial step 202 of method 200 comprises engaging a stump grinder with a vehicle. Another step 204 of method 200 comprises introducing a grinder wheel of the stump grinder to the stump. Another step 206 of method 200 comprises initiating rotation of the grinder wheel via a drive assembly of the stump grinder, wherein the grinder wheel rotates in a plane that is orthogonal to a longitudinal axis defined by the vehicle. Another step 208 of method 200 comprises cutting the stump from the ground surface.

In an exemplary embodiment, method 200 may include additional and/or optional steps for cutting a stump from a ground surface. An optional step may include aligning a portion of the grinder wheel that protrudes outside of a body of the stump grinder with the stump. Optional steps may include generating a first driving axis, via a power takeoff (PTO) of the vehicle, on a PTO drive shaft of a PTO assembly of the drive assembly; and generating a second driving axis, via a belt drive assembly of the drive assembly, on a grinder drive shaft operably engaged with the grinder wheel. Optional steps may include that wherein the step of generating the first driving axis further includes that the first driving axis is parallel with the longitudinal axis of the vehicle; and wherein the step of generating the second driving axis further includes that the second driving axis is parallel with the longitudinal axis of the vehicle and the first driving axis. An optional step may include rotating a push blade of a push blade assembly, via an actuator of the push blade assembly, between a front end of the stump grinder and a rear end of the stump grinder. An optional step may include determining a height of the stump relative to the ground surface, via the push blade, subsequent to the step of cutting the stump from the ground surface. An optional step may include removing cut stump material, via a push blade assembly, from the ground surface.

Figure 16:
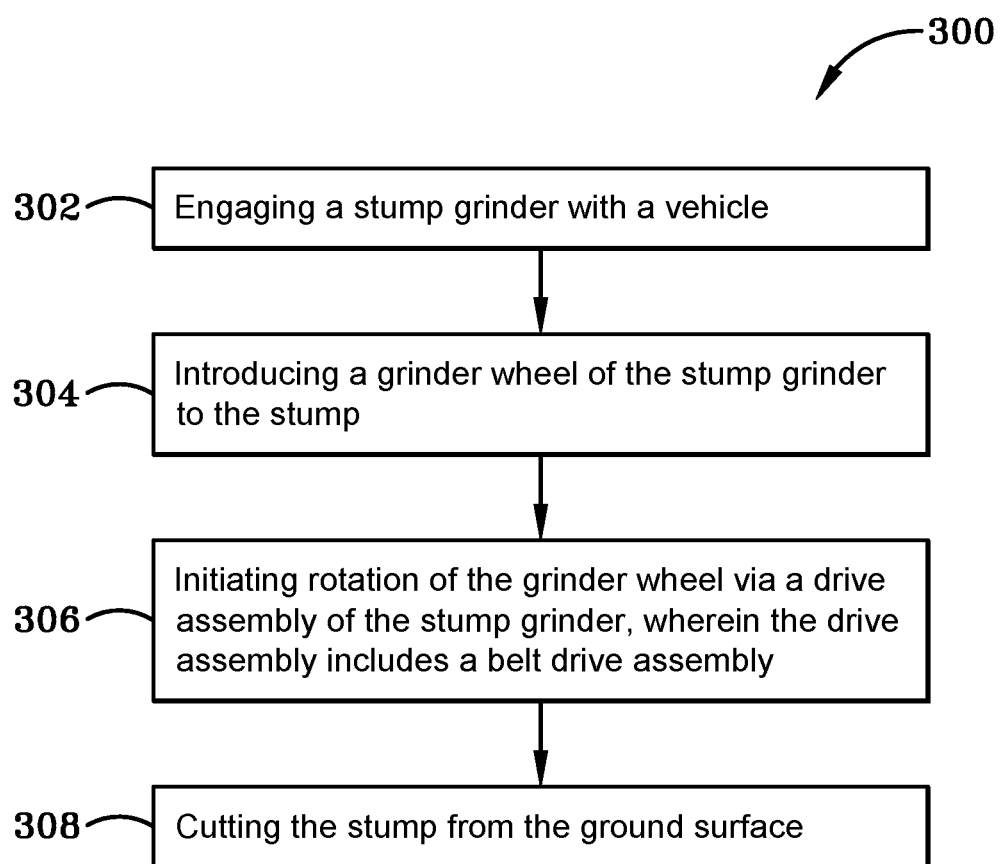
FIG. 16 is another exemplary method flowchart.

FIG. 16 includes a method 300 of cutting a stump from a ground surface. An initial step 302 of method 300 comprises engaging a stump grinder with a vehicle. Another step 304 of method 300 comprises introducing a grinder wheel of the stump grinder to the stump. Another step 306 of method 300 comprises initiating rotation of the grinder wheel via a drive assembly of the stump grinder, wherein the drive assembly includes a belt drive assembly. Another step 308 of method 300 comprises cutting the stump from the ground surface.

In an exemplary embodiment, method 300 may include additional and/or optional steps for cutting a stump from a ground surface. Optional steps may include engaging a power takeoff (PTO) of the drive assembly with a power takeoff of the vehicle; engaging the belt drive assembly with the power takeoff of the drive assembly; and engaging the belt drive assembly of the drive assembly with a grinder drive shaft operably engaged with the grinder wheel. Optional steps may include generating a first driving axis, via the PTO of the vehicle, along a PTO drive shaft of a PTO assembly of the drive assembly; and generating a second driving axis, via the belt drive assembly of the drive assembly, along a grinder drive shaft operably engaged with the grinder wheel. Optional steps may include that wherein the step of generating the first driving axis further includes that the first driving axis is parallel with a longitudinal axis of the vehicle; and wherein the step of generating the second driving axis further includes that the second driving axis is parallel with the longitudinal axis of the vehicle and the first driving axis.

Figure 17:
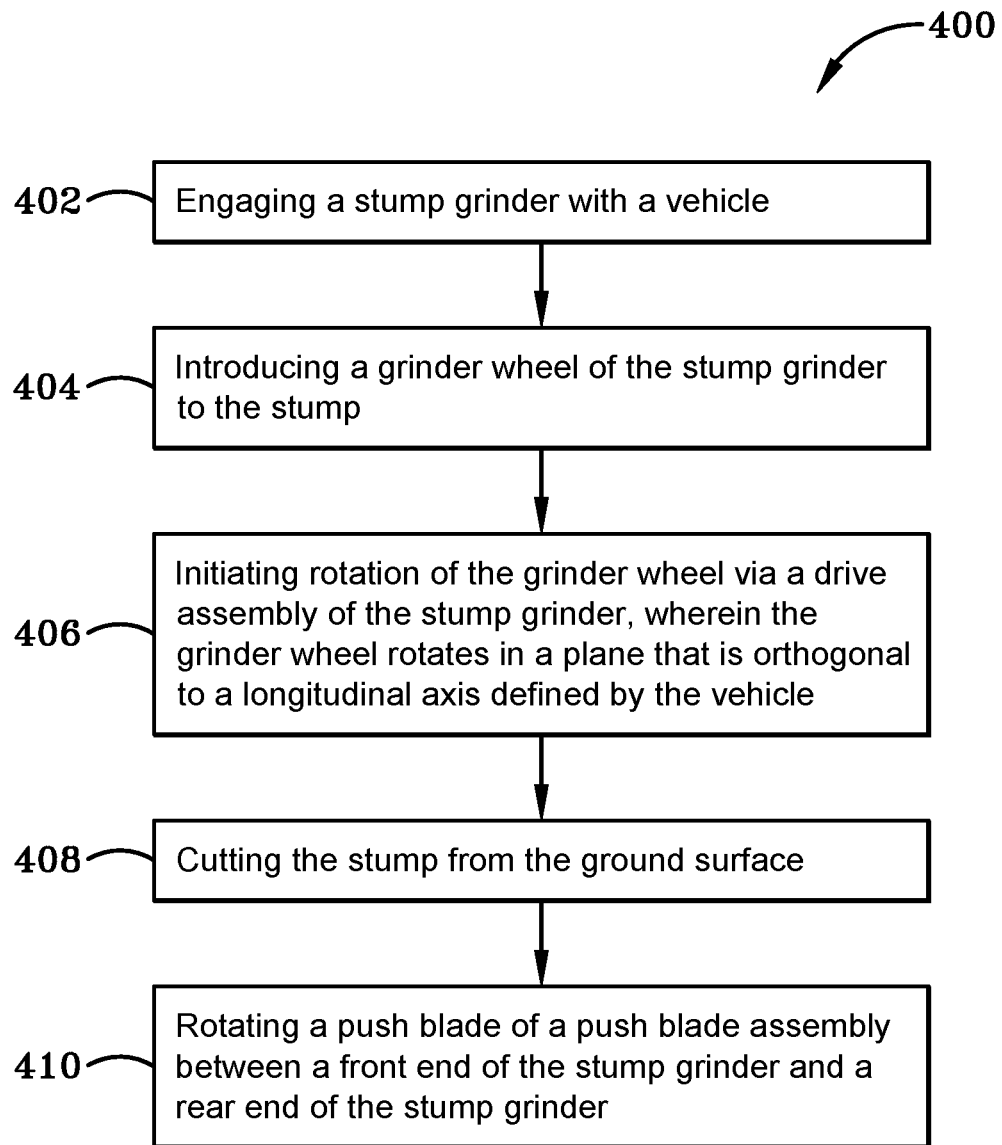
FIG. 17 is another exemplary method flowchart.

FIG. 17 includes a method 400 of cutting a stump from a ground surface. An initial step 402 of method 400 comprises engaging a stump grinder with a vehicle. Another step 404 of method 400 comprises introducing a grinder wheel of the stump grinder to the stump. Another step 406 of method 400 comprises initiating rotation of the grinder wheel via a drive assembly of the stump grinder, wherein the grinder wheel rotates in a plane that is orthogonal to a longitudinal axis defined by the vehicle. Another step 408 of method 400 comprises cutting the stump from the ground surface. Another step 410 of method 400 comprises rotating a push blade of a push blade assembly between a front end of the stump grinder and a rear end of the stump grinder.

In an exemplary embodiment, method 300 may include additional and/or optional steps for cutting a stump from a ground surface. An optional step may include determining a height of the stump relative to the ground surface, via the push blade, subsequent to the step of cutting the stump from the ground surface. An optional step may include removing cut stump material, via the push blade, subsequent to the step of cutting the stump from the ground surface. An optional step may include disengaging the stump grinder from the vehicle; and supporting the stump grinder, via the push blade assembly, independently of the vehicle.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A stump grinding system, comprising:
   a vehicle having a first end, a second end opposite to the first end, and a longitudinal axis defined therebetween; and
   a stump grinder adapted to engage with the vehicle, the stump grinder comprises:
      a chassis operably engaged with the vehicle at the first end or the second end;
      a body operably engaged with the chassis;
      a grinder wheel operably engaged with the body and partially disposed outside of the body; and
      a drive assembly operably engaged with the grinder wheel and the body, the drive assembly comprises:
         a power takeoff (PTO) assembly operably engaged with a PTO of the vehicle, wherein the PTO assembly comprises:
            a PTO pulley;
            a PTO drive shaft operably engaged with the PTO pulley; and
            a PTO belt operably engaged with the PTO pulley and the PTO of the vehicle;
         a belt drive assembly operably engaged with the PTO drive shaft; and
         a grinder drive shaft operably engaged with the belt drive assembly and the grinder wheel, the grinder drive shaft having a first end, a second end opposite to the first end, and a longitudinal axis defined therebetween that is parallel with the longitudinal axis of the vehicle;
      wherein the grinder wheel is configured to rotate in a plane that is orthogonal to the longitudinal axis of the vehicle.

2. The stump grinding system of claim 1, wherein a portion of the grinder wheel of the stump grinder is visible from an operator seat of the vehicle.

3. The stump grinding system of claim 1, wherein the body of the stump grinder further comprises:
   a first end;
   a second end opposite to the first end and defining an opening thereof; and
   a chamber defined between the first end and the second end;
   wherein a first portion of the grinder wheel is disposed inside of the chamber and a second portion of the grinder wheel passes through the opening outside of the chamber.

4. The stump grinding system of claim 1, wherein the belt drive assembly comprises:
   a first belt drive pulley operably engaged with the PTO drive shaft;
   a second belt drive pulley operably engaged with the grinder drive shaft and opposite to the first belt drive pulley;
   at least one belt operably engaged with the first belt drive pulley and the second belt drive pulley; and
   a belt tensioner operably engaged with the at least one belt to maintain the at least one belt with the first belt drive pulley and the second belt drive pulley at a predetermined tension.

5. The stump grinding system of claim 1, wherein the belt drive assembly comprises:
   a first belt drive pulley operably engaged with the PTO drive shaft;
   a second belt drive pulley operably engaged with the grinder drive shaft and opposite to the first belt drive pulley;
   a plurality of belts operably engaged with the first belt drive pulley and the second belt drive pulley; and
   a belt tensioner operably engaged with the plurality of belts to maintain the plurality of belts with the first belt drive pulley and the second belt drive pulley at predetermined tensions.

6. The stump grinding system of claim 1, wherein the stump grinder further comprises:
   a first driving axis defined by a PTO drive shaft of the PTO assembly that is parallel with the longitudinal axis of the vehicle; and
   a second driving axis defined by the grinder drive shaft this is parallel with the first driving axis and the longitudinal axis of the vehicle.

7. The stump grinding system of claim 1, wherein the stump grinder further comprises:
   at least one kickstand assembly rotatably engaged with the body;
   wherein the at least one kickstand assembly is selectively moveable between a stored position and an operating position for supporting the stump grinder.

8. The stump grinding system of claim 7, wherein the at least one kickstand assembly further comprises:
   a kickstand;
   a pivot mechanism rotatably engaging the kickstand to the body to enable the kickstand to be selectively moveable between the stored position and the operating position; and
   a pin selectively engaging the kickstand between the stored position and the operating position.

9. The stump grinding system of claim 1, wherein the stump grinder further comprises:
   a front end positioned proximate to the body;
   a rear end positioned proximate to the chassis and opposite to the front end; and
   a push blade assembly operatively engaged with the body;
   wherein the push blade assembly is independently rotatable on one or both of the chassis and the body along a longitudinal axis of the stump grinder between the front end of the stump grinder and the rear end of the stump grinder.

10. The stump grinding system of claim 9, wherein the push blade assembly comprises:
a push blade operably engaged with one or both of the chassis and the body, the push blade having a first end, a second end opposite to the first end, and a longitudinal axis defined therebetween;
at least one attachment mechanism operably engaging the push blade with the body; and
at least one actuator operably engaged with the chassis and the push blade for rotating the push blade along the longitudinal axis of the stump grinder between the stump grinder of the body and the rear end of the stump grinder.

11. The stump grinding system of claim 10, wherein the longitudinal axis of the push blade is orthogonal to the plane of rotation of the grinder wheel.

12. A stump grinding system, comprising:
a vehicle having a first end, a second end opposite to the first end, and a longitudinal axis defined therebetween; and
a stump grinder adapted to engage with the vehicle, the stump grinder comprises:
a chassis operably engaged with the vehicle at the first end or the second end;
a body operably engaged with the chassis;
a front end positioned proximate to the body;
a rear end positioned proximate to the chassis and opposite to the front end;
a grinder wheel operably engaged with the body and partially disposed outside of the body; and
a drive assembly operably engaged with the grinder wheel and the body; and
a push blade assembly operatively engaged with the body;
wherein the grinder wheel is configured to rotate in a plane that is orthogonal to the longitudinal axis of the vehicle; and
wherein the push blade assembly is independently rotatable on one or both of the chassis and the body along a longitudinal axis of the stump grinder defined between the front end of the stump grinder and the rear end of the stump grinder.

13. A method of cutting a stump from a ground surface, comprising steps of:
engaging a stump grinder with a vehicle;
introducing a grinder wheel of the stump grinder to the stump;
initiating rotation of the grinder wheel via a drive assembly of the stump grinder, wherein the grinder wheel rotates in a plane that is orthogonal to a longitudinal axis defined by the vehicle;
cutting the stump from the ground surface; and
rotating a push blade of a push blade assembly, via an actuator of the push blade assembly, between a front end of the stump grinder and a rear end of the stump grinder.

14. The method of claim 13, further comprising:
aligning a portion of the grinder wheel that protrudes outside of a body of the stump grinder with the stump.

15. The method of claim 13, further comprising:
rotating a power takeoff (PTO) drive shaft of a PTO assembly of the drive assembly, via a power takeoff of the vehicle, along a first drive axis defined by the PTO drive shaft; and
rotating a grinder drive shaft operably engaged with the grinder wheel, via a belt drive assembly of the drive assembly, along a second drive axis defined by the grinder drive shaft.

16. The method of claim 15, wherein the step of rotating the PTO drive shaft further includes that the first drive axis is parallel with the longitudinal axis of the vehicle; and
wherein the step of rotating the grinder drive shaft further includes that the second drive axis is parallel with the longitudinal axis of the vehicle and the first drive axis.

17. The method of claim 15, further comprising:
engaging cut stump material, via a push blade assembly, on the ground surface.

18. The method of claim 13, further comprising:
determining a height of the stump relative to the ground surface, via the push blade, subsequent to the step of cutting the stump from the ground surface.

19. A method of cutting a stump from a ground surface, comprising steps of:
engaging a stump grinder with a vehicle;
introducing a grinder wheel of the stump grinder to the stump;
initiating rotation of the grinder wheel via a drive assembly of the stump grinder, wherein the grinder wheel rotates in a plane that is orthogonal to a longitudinal axis defined by the vehicle;
rotating a power takeoff (PTO) drive shaft of a PTO assembly of the drive assembly, via a power takeoff of the vehicle, along a first drive axis defined by the PTO drive shaft; and
rotating a grinder drive shaft operably engaged with the grinder wheel, via a belt drive assembly of the drive assembly, along a second drive axis defined by the grinder drive shaft,
cutting the stump from the ground surface; and
engaging cut stump material, via a push blade assembly, on the ground surface.

* * * * *